(12) United States Patent
Stakanov et al.

(10) Patent No.: US 9,673,524 B2
(45) Date of Patent: Jun. 6, 2017

(54) COMPACT LOOP-TYPE ANTENNA DEVICE

(71) Applicant: Samsung Electro-Mechanics Co., Ltd., Suwon-Si (KR)

(72) Inventors: Sergey Stakanov, Suwon-Si (KR); Jong Lae Kim, Suwon-Si (KR); Dae Seong Jeon, Suwon-Si (KR); Sung Youl Choi, Suwon-Si (KR); Ju Hyoung Park, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 108 days.

(21) Appl. No.: 14/680,376

(22) Filed: Apr. 7, 2015

(65) Prior Publication Data

US 2015/0303572 A1      Oct. 22, 2015

(30) Foreign Application Priority Data

Apr. 18, 2014   (KR) .................. 10-2014-0046892
Jun. 24, 2014   (KR) .................. 10-2014-0077033
Jul. 29, 2014   (KR) .................. 10-2014-0096722

(51) Int. Cl.
  *H01Q 1/36*   (2006.01)
  *H01Q 7/00*   (2006.01)
  *H01Q 1/24*   (2006.01)
  *H01Q 1/38*   (2006.01)
  *H01Q 7/08*   (2006.01)
  *H01Q 1/12*   (2006.01)
  *G06K 7/10*   (2006.01)

(52) U.S. Cl.
  CPC ........... *H01Q 7/00* (2013.01); *G06K 7/10336* (2013.01); *H01Q 1/1207* (2013.01); *H01Q 1/243* (2013.01); *H01Q 1/38* (2013.01); *H01Q 7/08* (2013.01)

(58) Field of Classification Search
  CPC ......... H01Q 7/00; H01Q 7/08; G06K 7/10336
  USPC .................................... 343/700 MS, 788, 866
  See application file for complete search history.

(56) References Cited

U.S. PATENT DOCUMENTS 9,153,855 B2 * 10/2015 Yamaguchi .......... H01Q 1/2283
2004/0201535 A1   10/2004 Sano
2005/0270249 A1 * 12/2005 Saegusa .................. H01Q 7/00
                                                                343/788

(Continued)

FOREIGN PATENT DOCUMENTS

JP       2001-337181 A     12/2001
JP       2007-306137 A     11/2007

(Continued)

OTHER PUBLICATIONS

Extended European Search Report issued on Sep. 14, 2015 in counterpart European Patent Application No. 15163088.6. (6 pages in English).

*Primary Examiner* — Peguy Jean Pierre
(74) *Attorney, Agent, or Firm* — NSIP Law

(57) ABSTRACT

An antenna apparatus including a core member having a support part and first protrusion portions disposed on one surface of the support part, and a coil portion wound around the core member, wherein the core member further includes second protrusion portions disposed on the other surface of the support part, opposite to one surface of the support part, and the second protrusion portions have end surfaces provided as mounting surfaces, respectively.

40 Claims, 17 Drawing Sheets

(56) References Cited

U.S. PATENT DOCUMENTS

| | | | |
|---|---|---|---|
| 2006/0152427 A1* | 7/2006 | Ueda | H01Q 7/08 |
| | | | 343/788 |
| 2006/0214866 A1 | 9/2006 | Araki et al. | |
| 2008/0007473 A1 | 1/2008 | Yosui et al. | |
| 2009/0167498 A1 | 7/2009 | Fukuda et al. | |
| 2010/0060540 A1 | 3/2010 | Abe | |
| 2011/0291904 A1 | 12/2011 | Conway et al. | |
| 2012/0034957 A1 | 2/2012 | Kim et al. | |
| 2015/0061670 A1* | 3/2015 | Fordham | G01N 24/081 |
| | | | 324/309 |

FOREIGN PATENT DOCUMENTS

| | | |
|---|---|---|
| JP | 2011-139245 A | 7/2011 |
| KR | 10-2012-0013471 A | 2/2012 |
| KR | 10-2014-0025143 A | 3/2014 |
| WO | WO 2007/043626 A1 | 4/2007 |

* cited by examiner

COMPACT LOOP-TYPE ANTENNA DEVICE

CROSS-REFERENCE TO RELATED APPLICATIONS

This application claims the benefits under 35 USC 119(a) of Korean Patent Application Nos. 10-2014-0046892 filed on Apr. 18, 2014, 10-2014-0077033 filed on Jun. 24, 2014, and 10-2014-0096722 filed on Jul. 29, 2014, in the Korean Intellectual Property Office, the entire disclosures of which are incorporated herein by reference for all purposes.

BACKGROUND

1. Field

The following description relates to an antenna device, and an electronic component including the same.

2. Description of Related Art

In accordance with the continuous development of wireless communications technology, a number of users desiring to stream various contents in real time, such as video contents, has increased.

Consequently, technologies for ultra high speed data transmissions and mass data transmissions have been under continuous development, and in particular, the development of antennas capable of transmitting large amounts of data.

Additionally, a near field communications (NFC) technology is widely used in portable terminals, so as to enable communications between the portable terminals, such as data exchanges, and personal authentication. As used herein, NFC refers to a non-contact type near field communications module utilizing a frequency band of about 13.56 megahertz (MHz), and in order to use a radio signal within the above-mentioned frequency band, a separate antenna may be needed.

An NFC antenna, according to related art, generally uses a loop pattern and is formed in a planar shape so as to be mounted in a battery or on a cover of the portable terminal.

However, in a loop-type NFC antenna according to related art, in order to increase radiation efficiency of the antenna, the loop pattern forming the antenna must also increase to extend a total area of the NFC antenna. Therefore, there may not be sufficient space for the mounting of the antenna in the battery or on the cover of the portable terminal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an antenna apparatus includes a core member having a support part, first protrusion portions disposed on one surface of the support part, second protrusion portions disposed on the other surface of the support part, opposite to the one surface of the support part, and a coil portion wound around the core member, wherein the second protrusion portions have end surfaces provided as mounting surfaces, respectively.

In another general aspect, the core member is mounted on a first substrate through pad parts disposed on the mounting surfaces of the second protrusion portions, respectively.

In another general aspect, the first and second protrusion portions are disposed on the support part so that the core member has an 'H' shape.

In another general aspect, the first protrusion portions have an inclined end surface.

In another general aspect, the first protrusion portions have end surfaces through which magnetic flux enters and exits.

In another general aspect, a length of the first protrusion portions protruding from the support part is different from a length of one of the second protrusion portions protruding from the support part.

In another general aspect, the coil portion is wound around the support part.

In another general aspect, the coil portion is wound around each of the first protrusion portions.

In another general aspect, the antenna further includes a second substrate coupled to the core member, and the coil portion is positioned in a cavity of the second substrate.

In another general aspect, an apparatus includes a core member having end surfaces through which magnetic flux enters and exits and a mounting surface mounted on a first substrate, and a coil portion wound around the core member.

In another general aspect, the core member is mounted on the first substrate through a pad part disposed on the mounting surface of the core member.

In another general aspect, the core member has an angle of 180° of a direction in which the magnetic flux enters one of the end surfaces of the core member with respect to a direction in which the magnetic flux exits from one of the end surfaces of the core member.

In another general aspect, the core member further includes a first protrusion portion having the end surfaces, a second protrusion portion having the mounting surface, and a support part having the first protrusion portion disposed on a first surface of the support part and the second protrusion portion disposed on a second surface of the support part, opposite to the first surface of the support part.

In another general aspect, the coil portion is wound around one of the support part and the first protrusion portion.

In another general aspect, an apparatus includes a core member having a first core portion having a first end surface through which magnetic flux enters and exits and a first mounting surface opposite to the first end surface, a second core portion having a second end surface through which the magnetic flux enters and exits and a second mounting surface opposite to the second end surface, and a third core portion disposed between the first and second core portions, a coil portion wound around the core member, and first and second pad parts disposed on the first mounting surface of the first core portion and the second mounting surface of the second core portion, respectively.

In another general aspect, the core member is mounted on a first substrate through the first and second pad parts.

In another general aspect, one of the first and second end surfaces is inclined.

In another general aspect, areas of the first and second end surfaces are greater than areas of the first and second mounting surfaces, respectively.

In another general aspect, a distance from a first virtual line connecting the first and second end surfaces to one another to the third core portion is "a" and a distance from a second virtual line connecting the first and second mounting surfaces to one another to the third core portion is "b", "a" is greater than "b".

In another general aspect, the core member further includes a first extension forming part disposed on the first core portion, and a second extension forming part disposed on the second core portion, in which the first and second extension forming parts are disposed in opposing directions relative to the third core portion.

In another general aspect, the core member has a '⊥⊥' shape.

In another general aspect, the coil portion is wound around the first and second core portions.

In another general aspect, the apparatus further includes a second substrate having a cavity and coupled to the core member, in which the coil portion is positioned in the cavity of the second substrate.

In another general aspect, the coil portion is wound around the third core portion.

In another general aspect, the coil portion is wound around each of the first, second, and third core portions.

In another general aspect, an electronic component includes a first substrate, and an antenna apparatus disposed on the first substrate through first and second pad parts to be connected to a circuit part, in which the antenna apparatus includes a core member including a first core portion having a first mounting surface having the first pad part disposed thereon, a second core portion having a second mounting surface having the second pad part disposed thereon, and a third core portion disposed between the first and second core portions, and a coil portion wound around the core member.

In another general aspect, the first core portion further includes a first end surface opposite to the first mounting surface and the second core portion further includes a second end surface opposite to the second mounting surface, and magnetic flux enters and exits the first and second end surfaces, and the coil portion transmits and receives data through electromagnetic induction based on the entry and exit of the magnetic flux.

In another general aspect, when a distance from a first virtual line connecting the first and second end surfaces to one another to the third core portion is "a" and a distance from a second virtual line connecting the first and second mounting surfaces to one another to the third core portion is "b", "a" is greater than "b".

In another general aspect, one of the first and second end surfaces is inclined.

In another general aspect, areas of the first and second end surfaces are greater than areas of the first and second mounting surfaces, respectively.

In another general aspect, the coil portion is wound around each of the first and second core portions.

In another general aspect, the electronic component further includes a second substrate having a cavity and coupled to the core member, in which the coil portion is positioned in the cavity of the second substrate.

In another general aspect, the coil portion is wound around the third core portion.

In another general aspect, the core member further includes a first extension forming part disposed on the first core portion, and a second extension forming part disposed on the second core portion, in which the first and second extension forming parts are disposed in opposing directions relative to the third core portion.

In another general aspect, an electronic device includes a cover for an electronic device, an antenna apparatus disposed between the cover and the electronic device, and a first substrate having a circuit part to which the antenna apparatus is connected, in which the antenna apparatus includes a core member having a support part, first protrusion portions disposed on one surface of the support part, and second protrusion portions disposed on the other surface of the support part, opposite to one surface of the support part, and a coil portion wound around the core member, the second protrusion portions have end surfaces provided as mounting surfaces, respectively, and the antenna apparatus is mounted on the first substrate through pad parts disposed on the end surfaces of the second protrusion portions provided as the mounting surfaces, respectively.

In another general aspect, the circuit part includes a near field communication (NFC) chip electrically connected to the antenna apparatus.

In another general aspect, the coil portion is wound around the first protrusion portions.

In another general aspect, the antenna apparatus further includes a second substrate coupled to the core member, and the coil portion is positioned in a cavity of the second substrate.

In another general aspect, the antenna apparatus further includes a coil portion wound around the support part.

In another general aspect, the first protrusion portions have end surfaces through which magnetic flux enters and exits.

Other features and aspects will be apparent from the following detailed description, the drawings, and the claims.

BRIEF DESCRIPTION OF DRAWINGS

The above and other aspects, features and other advantages of the present disclosure will be more clearly understood from the following detailed description taken in conjunction with the accompanying drawings, in which.

Figure 1:
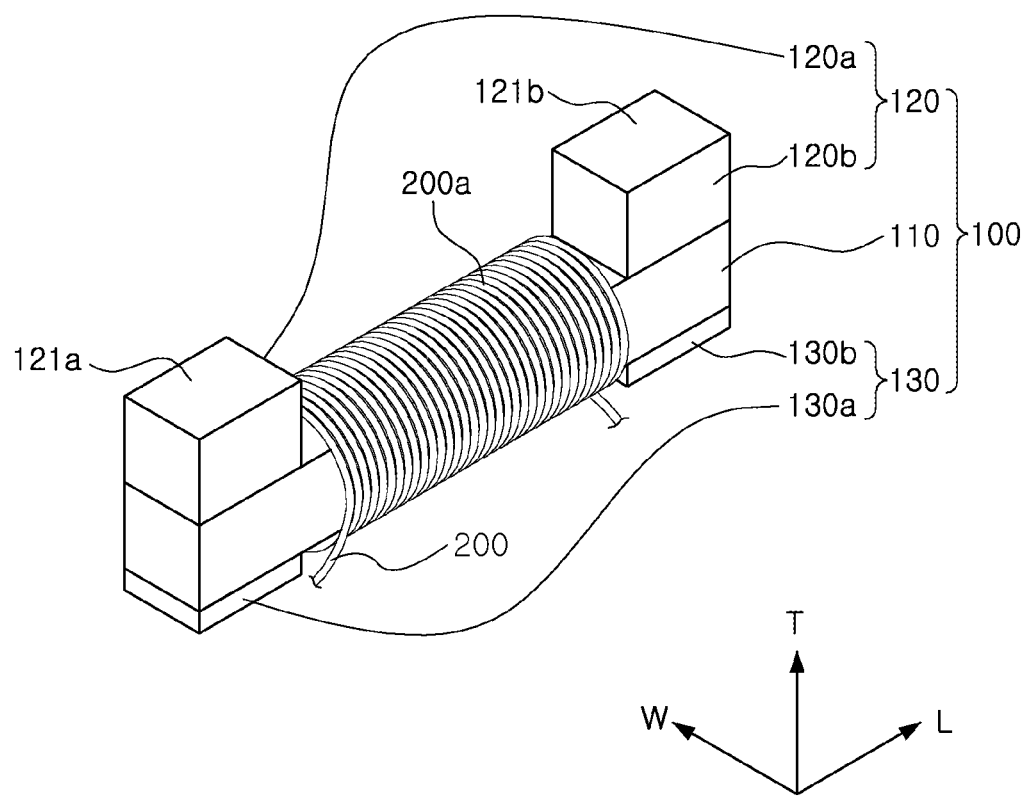
FIG. 1 is a perspective view illustrating an example of an antenna apparatus, according to an embodiment in the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In the drawings, the shapes and dimensions of elements may be exaggerated for clarity, and the same reference numerals will be used throughout to designate the same or like elements.

In addition, an antenna apparatus and an electronic component including the same will be described, and particularly, a near field communications (NFC) antenna apparatus will be described by way of example; however, the example of the antenna apparatus is not limited thereto.

FIG. 1 is a perspective view illustrating an example of an antenna apparatus according to an embodiment in the present disclosure.

Referring to FIG. 1, an antenna apparatus includes a core member 100 and a coil portion 200 wound around the core member 100. However, it is noted that this is simply an example of the coil portion 200 being wound around the core member 100 and thus is not limited thereto. For example, the coil portion 200 is not limited to a single wire and may be formed by a stranded wire or more than one wire. Similarly, although FIG. 1 illustrates the coil portion 200a being wound around almost an entire surface of a support part 110 of the core member 100, such wounding is not limited thereto and thus the winding can cover more or less of the surface of the support part 110.

The coil portion 200 is wound around at least one of a support part 110 and a plurality of first protrusion portions 120 of the core member 100. For ease of description, the coil portion wound around the support part 110 will be designated by 200a (see FIG. 1) and the coil portion wound around the plurality of first protrusion portions 120 will be designated by 200b (see FIG. 6A). In addition, a coil portion having common characteristics applicable to both a coil portion 200a and a coil portion 200b will be designated by 200.

The core member 100 includes the support part 110, the plurality of first protrusion portions 120, and a plurality of second protrusion portions 130.

Figure 3A:
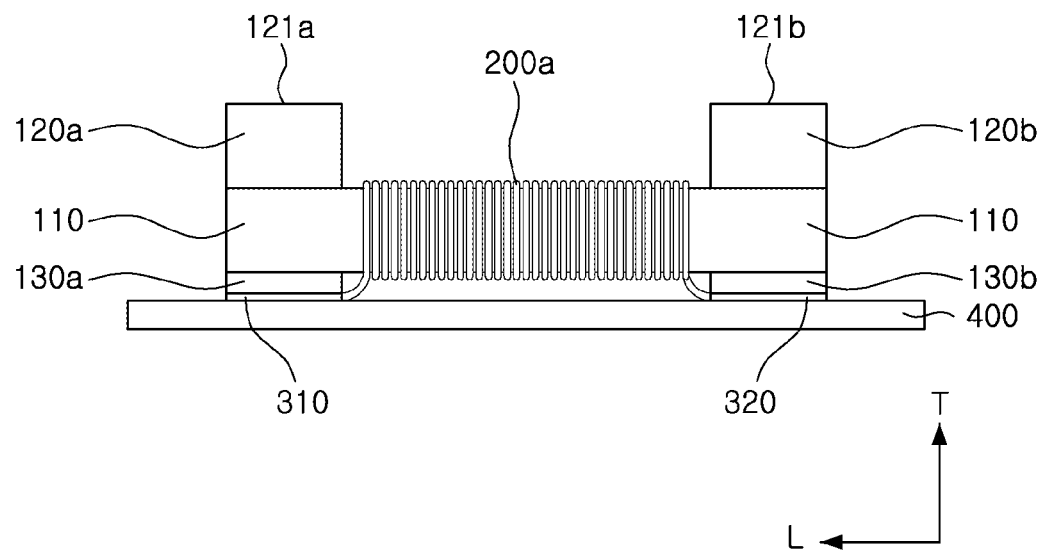
FIGS. 3A and 3B are views illustrating an example of an antenna apparatus, according to an embodiment in the present disclosure, mounted on a first substrate.

As shown in FIG. 3A, the support part 110 includes an end surface having a polygonal shape or a circular shape so that the antenna apparatus is mounted on a first substrate 400 to thereby facilitate the miniaturization of the antenna apparatus. However, the support part 110 is not limited to the above discussed shapes and thus may have any other shape suitable for mounting the antenna apparatus on the first substrate 400. Furthermore, although FIG. 3A illustrates the second protrusion portion 130a and 130b and first and second pad parts 310 and 320, to be later described, to be separate structural elements from the support part 110, in an alternative embodiment, the first and second protrusion portions 130a and 130b and the first and second pad parts 310 and 320 may be integral parts of the support part 110. Referring to FIG. 1, the support part 110 has a hexahedral shape or a cylindrical shape. In this case, directions of a hexahedron will be defined in order to clearly describe the core member 100 according to the embodiment in the present disclosure. L, W and T illustrated in FIG. 1 refer to a length direction, a width direction, and a thickness direction, respectively.

The plurality of first protrusion portions 120 are disposed on one surface of the support part 110 and the plurality of second protrusion portions 130 are disposed on the other surface of the support part 110, opposite to one surface of the support part 110.

Hereinafter, the surface of the support part 110 on which the plurality of first protrusion portions 120 are disposed will be referred to as one surface or a first surface of the support part 110, and the surface of the support part 110 on which the plurality of second protrusion portions 130 are disposed will be referred to as the other surface or a second surface of the support part 110, opposite to the one surface or first surface of the support part 110.

For example, the plurality of first protrusion portions 120 are two first protrusion portions 120a and 120b, in which the two first protrusion portions 120a and 120b are disposed on one surface of the support part 110 at both ends thereof in a length direction of the support part 110, respectively.

However, the disposition of the plurality of first protrusion portions 120 is not limited thereto. For example, as long as the plurality of first protrusion portions 120 allow for entry and exit of magnetic flux, the disposition thereof may be provided in various manners. Meanwhile, the length direction of the support part 110 refers to a direction of a side thereof having a greatest length among sides of the support part 110.

The plurality of second protrusion portions 130 includes second protrusion portions 130a and 130b, which are disposed on the other surface of the support part 110, opposite to one surface of the support part 110 at both ends thereof in the length direction, respectively.

However, the disposition of the plurality of second protrusion portions 130 is not limited thereto, and is not limited to a particular example as long as the second protrusion portion 130 has a mounting surface such that the core member 100 is mounted on a first substrate 400 (see FIG. 3A) through first and second pad parts 310 and 320 (see FIG. 3A). A case in which the plurality of second protrusion portions 130 have a plurality of mounting surfaces, respectively, will be described with reference to FIG. 2.

For example, the plurality of first protrusion portions 120 are disposed on one surface of support part 110, and the plurality of second protrusion portions 130 are disposed on the other surface of the support part 110, opposite to one surface of the support part 110, so as to protrude in opposing directions. Accordingly, the plurality of first protrusion portions 120 are collinear with the support part 110, and the plurality of second protrusion portions 130 are collinear with the support part 110.

Further, the plurality of first protrusion portions 120 and the plurality of second protrusion portions 130 may have an overall pillar shape (see FIG. 1), but the shape of the first and second protrusion portions 120 and 130 is not limited thereto.

For example, even when the plurality first and second protrusion portions 120 and 130 among the components of the antenna apparatus are described to each have two protrusion portions, this is merely for ease of description and the number of the plurality of first and second protrusion portions 120 and 130 is not limited thereto.

Referring to FIG. 1, an end surface of each of the plurality of first protrusion portions 120 is illustrated as being a quadrangular shape, but the shape of the end surface of the first protrusion portion 120 is not limited thereto.

In addition, an end surface of each of the plurality of second protrusion portions 130 is also illustrated as being a quadrangular shape, but the shape of the end surface of the second protrusion portion 130 is not limited thereto. Further, the shapes of each of the plurality of first protrusion portions 120 and each of the plurality of second protrusion portions 130 may be distinct from one another.

The two first protrusion portions 120a and 120b include two end surfaces 121a and 121b through which magnetic flux enters and exits, respectively. For example, in a case in which the magnetic flux exits from the end surface 121a of the first protrusion portion 120a, the magnetic flux enters the end surface 121b of the first protrusion portion 120b. Conversely, in a case in which the magnetic flux enters the end surface 121a of the first protrusion portion 120a, the magnetic flux exits from the end surface 121b of the first protrusion portion 120b. However, the entering and exiting of the magnetic flux is not limited thereto. For example, the magnetic flux may enter and exit from other areas of the support part 110.

The core member 100 is formed by combining a material, or the like including a magnetic material such as ferrite, or the like having a predetermined dielectric constant and permeability with a composite material such as ceramic, or the like, in order to transmit and receive an NFC signal within a low frequency band, by using a sintering scheme, a molding scheme, or the like.

The core member 100 among the components of the antenna apparatus according to the embodiment in the present disclosure may have an "H" shape. However, the shape of the core member 100 is not limited thereto and thus the core member 100 may have any other shape or form. For example, the core member 100 may have a "U" shape.

More particularly, each of the first two first protrusion portions 120a and 120b are disposed at each end of the support part 110 in a length direction, respectively. In addition, each of the second protrusion portions 130a and 130b are disposed on the support part 110 so as to be opposite to the two first protrusion portions 120a and 120b, respectively.

In addition, the first protrusion portions 120a and 120b have volumes greater than those of the second protrusion portions 130a and 130b, respectively. Therefore, in the antenna apparatus, according to the embodiment in the present disclosure, the volumes of the first protrusion portions 120a and 120b associated with the entry and exit of the magnetic flux are formed to be greater than those of the second protrusion portions 130a and 130b, whereby efficiency of the entry and exit of the magnetic flux is increased and reliability of the antenna apparatus is improved. However, the relationship of volumes between the first protrusion portions 120a and 120b and the second protrusion portions 130a and 130b is not limited thereto. That is the first protrusion portions 120a and 120b and the second protrusion portions 130a and 130b may have the same volumes.

Meanwhile, the mounting surfaces 131a and 131b of the two second protrusion portions 130a and 130b are formed to have sufficiently great areas, respectively. Therefore, when the core member 100 is mounted on the first substrate 400 (FIG. 3A), a fixing strength there between is improved.

The coil portion 200a is wound around the support part 110 so as to form the magnetic flux that enters and exits from the core member 100.

More particularly, the coil portion 200a is wound around the support part 110 in a single direction so that the magnetic flux enters or exits through the two first protrusion portions 120a and 120b.

That is, in a case in which an external electronic device using an NFC scheme and the antenna apparatus, according to the embodiment, are disposed to face one another, a magnetic path is formed between the external electronic device and the antenna apparatus and, consequently, data is transmitted and received through electromagnetic induction.

Referring to FIG. 1, the coil portion 200a is wound around the support part 110 so as to transmit and receive a signal in a frequency band of about 13.56 MHz to perform the NFC scheme. The coil portion 200a is electrically connected to a circuit part including an NFC chip (not illustrated) of the first substrate 400 (see FIG. 3A).

That is, the coil portion 200a is wound around the support part 110 so as to perform transmission and reception of data with the external electronic device through the electromagnetic induction formed based on the entry and exit of the magnetic flux through the end surfaces 121a and 121b of the respective first protrusion portions 120a and 120b. In this case, the external electronic device includes an antenna capable of transmitting and receiving a signal in the same frequency band as that of the antenna apparatus according to the embodiment.

More particularly, the coil portion 200a is electrically connected to the circuit part including the NFC chip through pad parts 310 and 320 (see FIG. 3A) attached to the mounting surfaces 131a and 131b of the plurality of second protrusion portions 130, respectively.

In addition, an outer circumferential surface of a metal wire formed of copper (Cu), or silver (Ag), and coated by applying an insulating coat formed of a polyurethane resin, or polyester resin, is used as the coil portion 200a. Furthermore, the coil portion 200a is not limited to a single wire and may be formed by a stranded wire or two or more wires.

The coil portion 200a is wound around the support part 110 so as to surround the support part 110 in a circular manner as illustrated in FIG. 1, but the winding of the coil portion 200a is not limited thereto. For example, the coil portion 200a may be wound around the support part 110 so as to have the end surface thereof having the same shape as that of the end surface of the support part 110, for example, a quadrangular shape.

Further, the shape of the end surface of the coil portion 200a is not limited to the circular end surface, but the coil portion 200a may also have a polygonal end surface.

Figure 2:
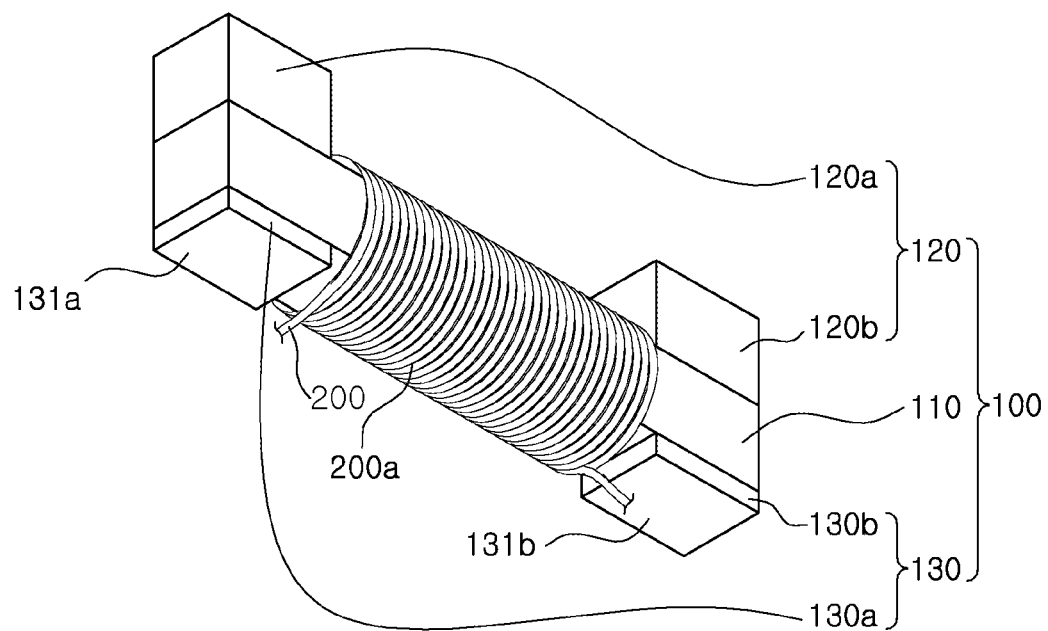
FIG. 2 is a perspective view illustrating an example of the antenna apparatus illustrated in FIG. 1 at a different angle.
Figure 2:
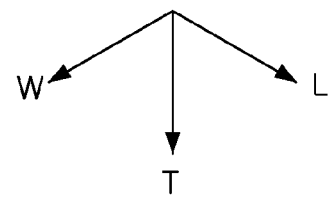

FIG. 2 is a perspective view illustrating an example of the antenna apparatus illustrated in FIG. 1 at a different angle.

Referring to FIG. 2, the plurality of second protrusion portions 130 include the two second protrusion portions 130a and 130b by way of example. Furthermore, the two second protrusion portions 130a and 130b include the end surfaces 131a and 131b provided as the mounting surfaces allowing for the mounting on the first substrate 400 (see FIG. 4A), respectively.

The core member 100 is mounted on the first substrate 400 (see FIG. 3A) through the first and second pad parts 310 and 320 (see FIG. 3A) attached to the end surfaces 131a and 131b of the two second protrusion portions 130a and 130b, respectively. For example, a side of the other surface of the support part 110 on which the two second protrusion portions 130a and 130b are disposed may be a side on which the first substrate 400 (see FIG. 3A) is present.

In this case, in the antenna apparatus according to the embodiment in the present disclosure, the entirety of the other surface of the support part 110 may not be provided as the mounting surface allowing for the mounting on the substrate, but the antenna apparatus may separately include the plurality of second protrusion portions 130 having the mounting surfaces 131a and 131b for allowing the mounting on the first substrate 400 (FIG. 3A), respectively.

Therefore, the support part 110 is spaced apart from the first substrate 400 (see FIG. 3A) by a distance equal to a total of a height of each of the first and second pad parts 310 and 320 (see FIG. 3A) and a height of each of the plurality of second protrusion portions 130. Thereby, in the case in which the coil portion 200a is wound around the support part 110, a sufficient space for the winding of the coil portion 200a is secured and the coil portion 200a is wound relatively easily.

Therefore, since the sufficient space for the winding of the coil portion 200a is secured and the direct mounting on the first substrate 400 (see FIG. 3A) is also achieved, a separate equipment or structure for mounting of the antenna apparatus on the first substrate 400 (FIG. 3A) is not be required, unlike in the related art.

A description thereof will be provided below with reference to FIGS. 3A and 3B.

Figure 3B:
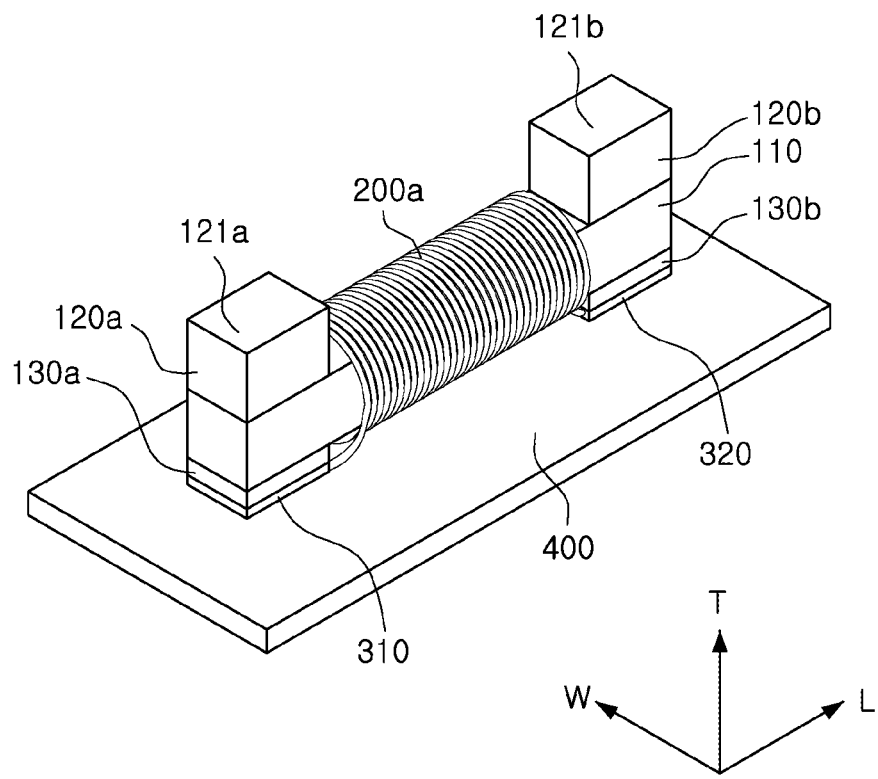

FIGS. 3A and 3B are views illustrating an example of an antenna apparatus according to an embodiment in the present disclosure mounted on a first substrate.

Referring to FIGS. 3A and 3B, the two first protrusion portions 120a and 120b have the end surfaces 121a and 121b through which the magnetic flux enters and exits, so as to form the magnetic path, respectively. In addition, the two second protrusion portions 130a and 130b have the end surfaces 131a and 131b provided as the mounting surfaces, so as to perform a surface mount technology (SMT) on the first substrate 400 through the first and second pad parts 310 and 320, respectively.

The core member 100 is formed in the 'H' shape by way of example, so as to provide a common magnetic flux path, whereby eddy current loss is significantly reduced.

More particularly, referring to FIGS. 3A and 3B, the antenna apparatus according to the embodiment in the present disclosure is mounted on the first substrate 400 through the first and second pad parts 310 and 320 attached to the mounting surfaces 131a and 131b (see FIG. 2) of the two second protrusion portions 130a and 130b, respectively.

The first substrate 400 is a substrate mounted in an interior of a portable terminal such as a smartphone, in which the circuit part having the NFC chip (not illustrated) is disposed on the first substrate 400. In addition, the first substrate 400 includes a plurality of active elements, a plurality of passive elements, integrated circuits (ICs). However, this is merely an example of the elements included in the first substrate 400 and more or less elements may be included in the first substrate 400. Additionally, a printed circuit board (PCB) is provided as the first substrate 400, but is not limited thereto.

The antenna apparatus according to the embodiment in the present disclosure is mounted on one surface of the first substrate 400.

The first and second pad parts 310 and 320 are positioned to be spaced apart from one another so as to perform an SMT on the first substrate 400.

In this case, the antenna apparatus according to the embodiment is electrically connected to the first substrate 400 by a soldering scheme in a state in which the first and second pad parts 310 and 320 are disposed on the first substrate 400 to be in contact therewith. Although it is indicated that the antenna apparatus is electrically connected to the first substrate 400 by a soldering scheme, such scheme is not limited thereto and any other suitable connection scheme may be used, such as gluing or welding.

Figure 4A:
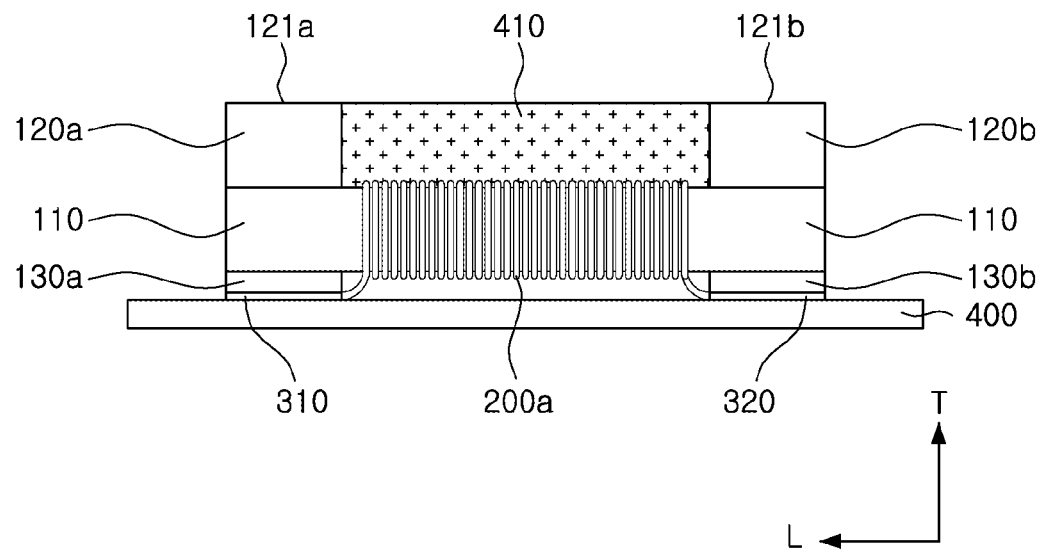
FIG. 4A is a view illustrating an example of a first molding part further included in the antenna apparatus mounted on the first substrate illustrated in FIG. 3A.

FIG. 4A is a view illustrating an example of a first molding part included in the antenna apparatus mounted on the first substrate illustrated in FIG. 3A.

Referring to FIG. 4A, an electronic component having the antenna apparatus mounted on the first substrate 400 further includes a first molding part 410 disposed between the two first protrusion portions 120a and 120b.

The first molding part 410 is disposed between the two first protrusion portions 120a and 120b so that the end surfaces 121a and 121b of the first protrusion portions 120a and 120b are exposed externally.

As an example of the first molding part 410, an epoxy molding compound (EMC) is used. However, the molding compound is not limited thereto and any suitable molding compound may be used.

Although FIG. 4A illustrates a case in which the end surfaces 121a and 121b of the first protrusion portions 120a and 120b are coplanar with the first molding part 410, the position of the end surfaces 121a and 121b of the first protrusion portions 120a and 120b with respect to the first molding part 410 is not limited thereto.

Figure 4B:
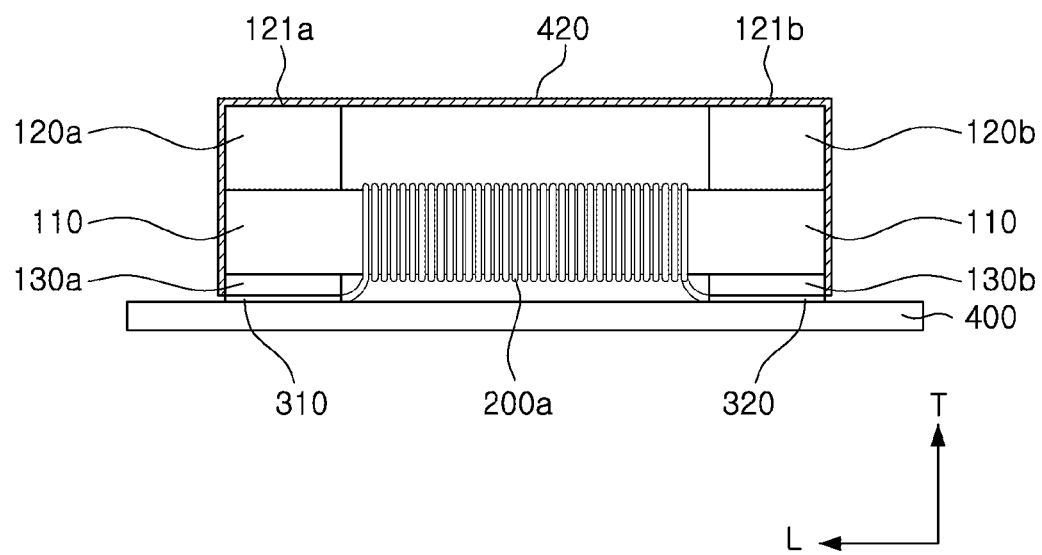
FIG. 4B is a view illustrating an example of a second molding part further included in the antenna apparatus and mounted on the first substrate illustrated in FIG. 3A.

FIG. 4B is a view illustrating an example of a second molding part further included in the antenna apparatus mounted on the first substrate illustrated in FIG. 3A.

Referring to FIG. 4B, the second molding part 420 is formed so as to encapsulate the support part 110, the two first protrusion portions 120a and 120b, and the two second protrusion portions 130a and 130b.

In particular, the second molding part 420 is formed so as to cover both side surfaces of the support part 110 in the length direction while simultaneously covering the end surfaces 121a and 121b of the two first protrusion portions 120a and 120b. By being formed so as to encapsulate the antenna apparatus, the second molding part 420 may serve as a cover for preventing external infiltration of foreign materials, or the like, there into.

Furthermore, the antenna apparatus according to the embodiment in the present disclosure includes a chip structure by forming the first molding part 410 or the second molding part 420 therein, so as to allow for product miniaturization.

Figure 5:
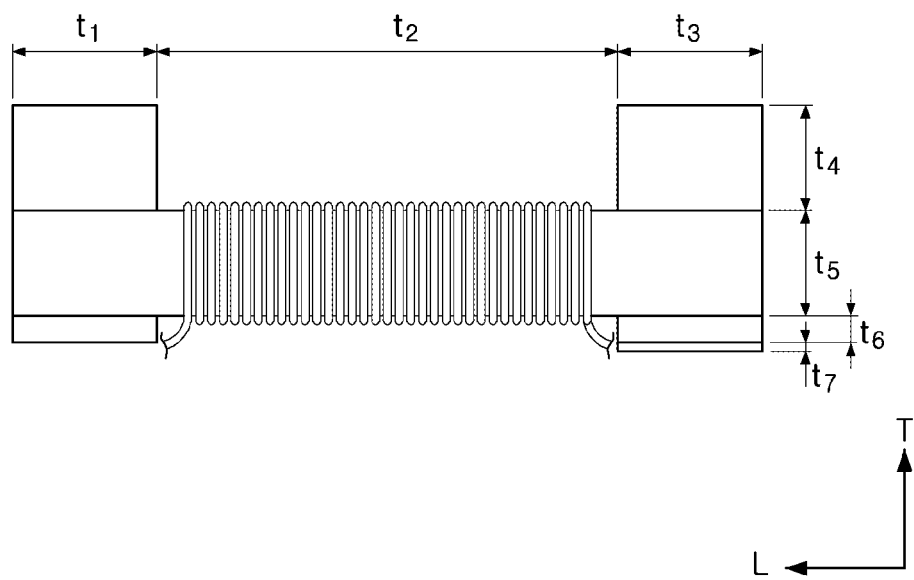
FIG. 5 is a view illustrating lengths and heights of respective components of an example of an antenna apparatus, according to an embodiment in the present disclosure.

FIG. 5 is a view illustrating lengths and heights of respective components of an example of an antenna apparatus according to an embodiment in the present disclosure.

Referring to FIG. 5, the antenna apparatus has a size of 8.0×1.3×4 millimeters (mm).

More particularly, lengths t1 and t3 of the respective first protrusion portions 120a and 120b in the length direction may each be 1.5 mm. Further, since an entire length of the support part 110 in the length direction is 8 mm, equal to a total of lengths (t1+t2+t3), the length t2, which is equal to a length of a portion of the support part 110, is 5 mm.

The first protrusion portions 120a and 120b may each have a height t4 of 0.5 mm and the support part 110 may also have a height t5 of 0.5 mm Meanwhile, the second protrusion portions 130a and 130b may each have a height t6 of 0.2 mm and the first and second pad parts 310 and 320 may each have a height t7 of 0.1 mm. However, as long as the plurality of first protrusion portions 120 allow for the entry and exit of the magnetic flux and the plurality of second protrusion portions 130 include the respective mounting surfaces allowing for the mounting on the first substrate 400 (see FIG. 3A), the height of the first protrusion portions 120 and the second protrusion portions 130 is not limited to the above-mentioned values. Similarly, the height of the support part 110 and the first and second pad parts 310 and 320 is not limited to the above-mentioned values.

Accordingly, it may be appreciated that an area of the substrate occupied by the antenna apparatus is significantly reduced, as compared to a loop-type NFC antenna according to the related art which has a size of 40×30×0.3 mm Therefore, the antenna apparatus according to the embodiment may have a chip structure so as to allow for product miniaturization.

Figure 6A:
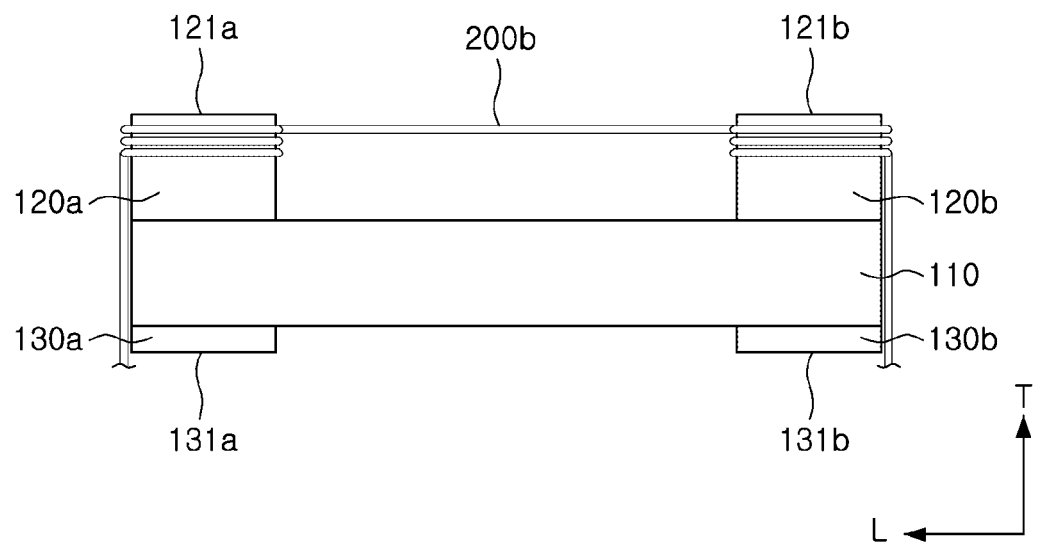
FIGS. 6A and 6B are views illustrating an example in which a coil portion is wound around at a different position of an antenna apparatus, according to an embodiment in the present disclosure.
Figure 6B:
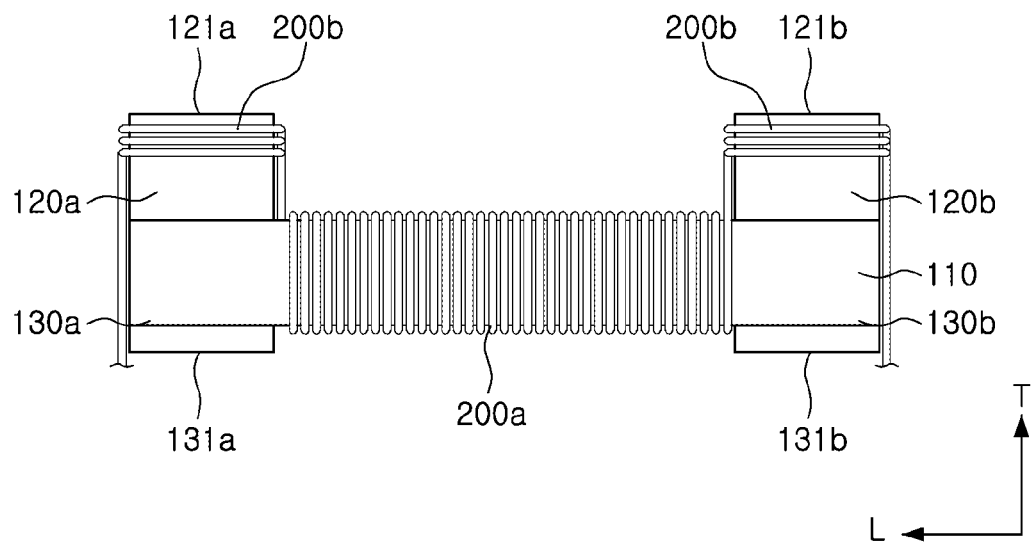

FIGS. 6A and 6B are views illustrating an example in which a coil portion is wound around at a different position of an antenna apparatus according to an embodiment in the present disclosure.

Referring to FIG. 6A, the coil portion 200b is wound around the plurality of first protrusion portions 120.

More particularly, when the plurality of first protrusion portions 120 are the two first protrusion portions 120a and 120b, the coil portion 200b is wound around each of the two first protrusion portions 120a and 120b. In this case, the coil portion 200b is wound around the two first protrusion portions 120a and 120b in a single direction.

The coil portion 200b includes a coil connecting portion that connects coil portions wound around the respective first protrusion portions 120a and 120b to one another. In addition, the coil portion 200b is connected to the first and second pad parts 310 and 320 (see FIG. 3A) attached to the mounting surfaces 131a and 131b of the two second protrusion portions 130a and 130b, respectively.

The number of coils of the coil portion 200b being wound around each of the two first protrusion portions 120a and 120b is determined based on a resonance frequency of the antenna apparatus so as to transmit and receive a signal in a frequency band of about 13.56 MHz. Meanwhile, since the coil portion 200b is of the same material and shape as those of the aforementioned coil portion 200a wound around the support part 110, a repeated description thereof will be omitted for conciseness.

Referring to FIG. 6B, the antenna apparatus includes the coil portion 200 wound around each of the plurality of first protrusion portions 120 and the support part 110.

In this case, the coil portion 200a wound around the support part 110 and the coil portion 200b wound around the plurality of first protrusion portions 120 are both connected to the first and second pad parts 310 and 320 (see FIG. 3A) attached to the mounting surfaces 131a and 131b of the two second protrusion portions 130a and 130b, respectively.

Since the coil portions 200a and 200b have the same material and shape as those described above, a repeated description thereof will be omitted for conciseness.

Figure 7A:
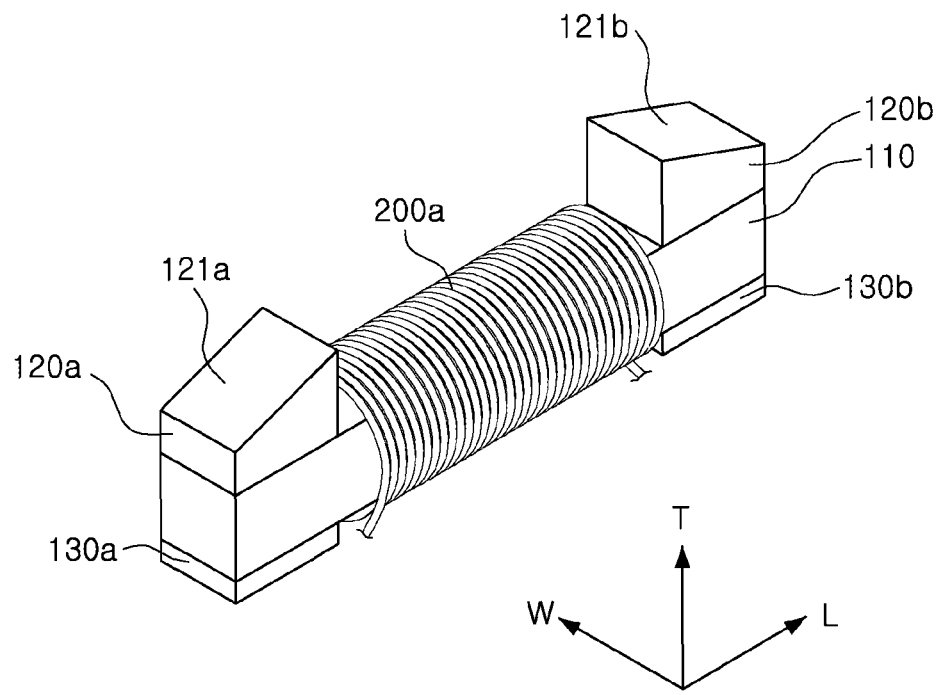
FIGS. 7A through 7C are views illustrating examples of a plurality of first protrusion portions among components of the antenna apparatus illustrated in FIG. 1.
Figure 7B:
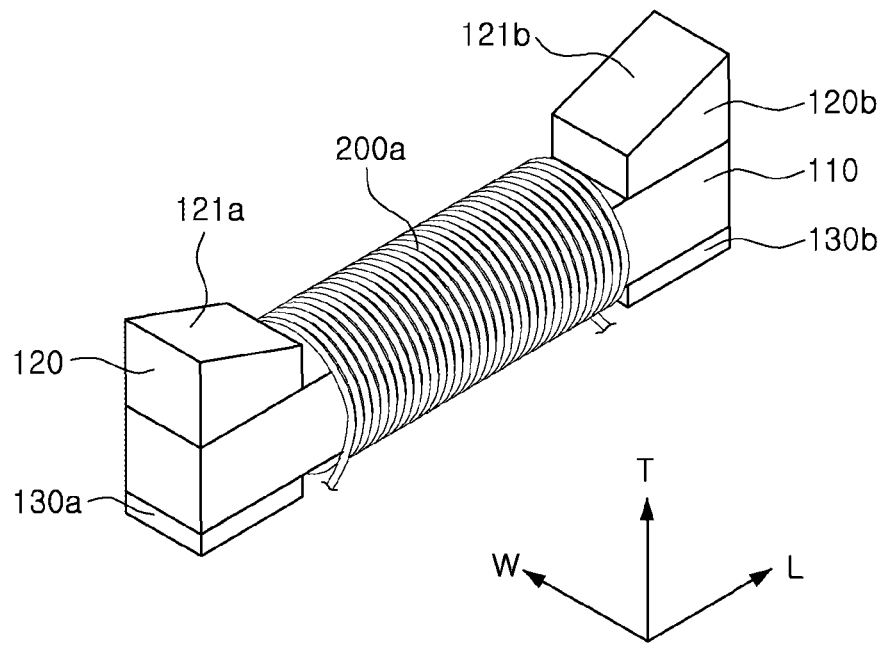
Figure 7C:
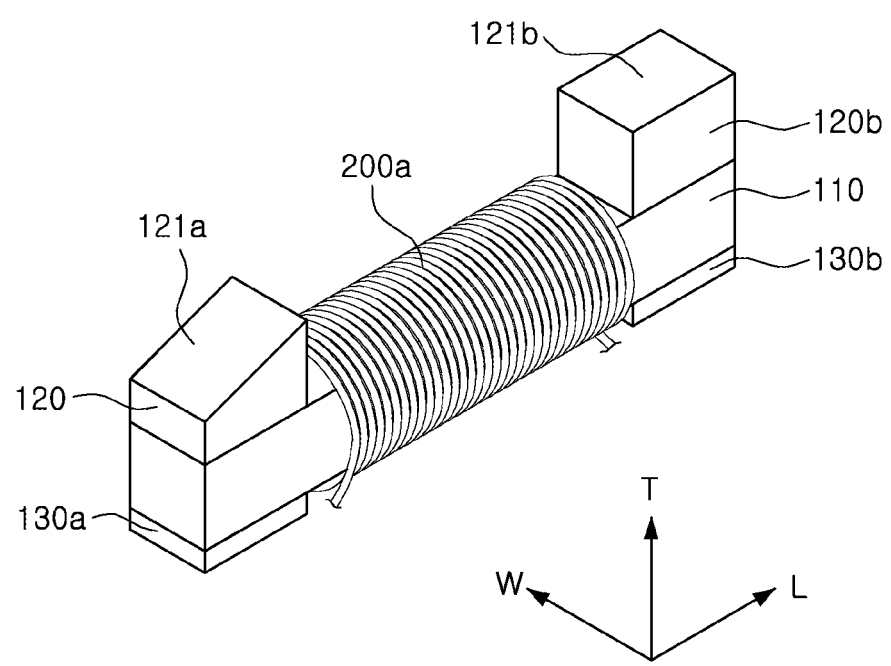

FIGS. 7A through 7C are views illustrating examples of the plurality of first protrusion portions among components of the antenna apparatus illustrated in FIG. 1.

Referring to FIGS. 7A and 7B, the two first protrusion portions 120a and 120b of the antenna apparatus have inclined end surfaces 121a and 121b, respectively but their shapes are not limited thereto and may have other shapes.

In this case, the two end surfaces 121a and 121b have inclined angles different from one another. In addition, the inclined end surfaces 121a and 121b are formed to face outward in opposite directions (see FIG. 7A), or are formed inwardly to face one another in a common direction (see FIG. 7B). However, the orientations of the two end surfaces 121a and 121b are not limited thereto.

Further, referring to FIG. 7C, one end surface 121a of the end surfaces 121a and 121b of the respective first protrusion portions 120a and 120b is inclined but is not limited thereto.

That is, referring to FIGS. 7A through 7C, the directions or the inclined angles of the respective end surfaces 121a and 121b are different from one another, and the direction of magnetic flux that enters and exits from the two end surfaces 121a and 121b and a shape of a magnetic path formed by the magnetic flux is changed.

The shape of the core member 100 is not limited to the example illustrated in FIGS. 7A through 7C, and the core member 100 may be formed to have a width, a height, or a size such that the coil portion 200a may be sufficiently wound around the core member 100.

For example, in the configuration of the core member 100, a distance between the two first protrusion portions 120a and 120b and a distance between the two second protrusion portions 130a and 130b do not need to be the same as one another as illustrated in FIGS. 7A through 7C, the distances between the first protrusion portions and the distances between second protrusion portions may be different from one another.

In addition, the two first protrusion portions 120a and 120b may have volumes greater than those of the two second protrusion portions 130a and 130b, respectively. Therefore, in the antenna apparatus, the volumes of the first protrusion portions 120a and 120b, associated with the entry and exit of the magnetic flux may be formed to be greater than those of the second protrusion portions 130a and 130b, whereby efficiency of the entry and exit of the magnetic flux is increased and reliability of the antenna apparatus is improved.

Meanwhile, the mounting surfaces 131a and 131b of the two second protrusion portions 130a and 130b are formed to have sufficiently great areas, respectively. Therefore, in the case in which the core member 100 is mounted on the first substrate 400 (see FIG. 3A), fixing strength there between is improved.

That is, as long as the core member 100 has a structure in which the end surfaces of the plurality of first protrusion portions 120 through which the magnetic flux enters and exits are exposed outwardly and the plurality of second protrusion portions 130 have the mounting surfaces allowing for the mounting on the first substrate 400 (see FIG. 3A), the antenna apparatus is not limited to the examples illustrated in FIGS. 1 through 7.

Figure 8A:
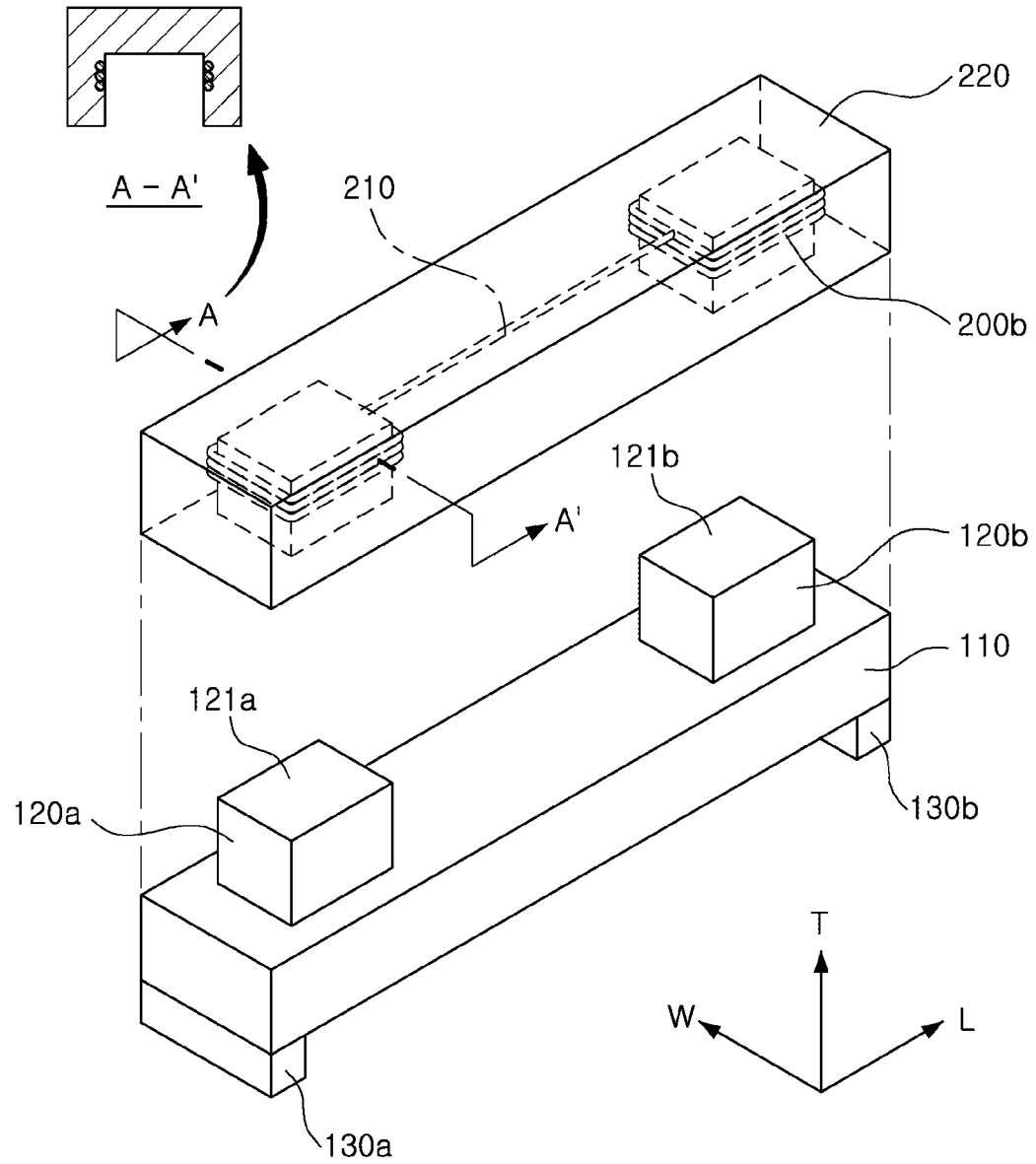
FIG. 8A is an exploded view illustrating an example in which a coil portion is wound around a plurality of first protrusion portions of an antenna apparatus, according to an embodiment in the present disclosure.

FIG. 8A is an exploded view illustrating an example in which the coil portion is wound around the plurality of first protrusion portions in an antenna apparatus according to an embodiment in the present disclosure.

Referring to FIG. 8A, an antenna apparatus according to an embodiment in the present disclosure includes the coil portion 200b wound around the plurality of first protrusion portions 120.

More particularly, when the plurality of first protrusion portions 120 are the two first protrusion portions 120a and 120b, the coil portion 200b is wound around each of the two first protrusion portions 120a and 120b.

The antenna apparatus according to the embodiment in the present disclosure further includes a second substrate 220 having a cavity. The coil portion 200b is positioned in the cavity of the second substrate 220.

Referring to line A-A' in FIG. 8A, the coil portion 200b is formed to surround the cavity of the second substrate 220, and the two first protrusion portions 120a and 120b are positioned in the cavity, such that the second substrate 220 in which the coil portion 200b is positioned is coupled to the core member 100.

The shape and size of the cavity of the second substrate 220 is determined based on the shape, the number, and the height of the plurality of first protrusion portions 120 of the core member 100. For example, in the case in which the plurality of first protrusion portions 120 are the two first protrusion portions 120a and 120b, the cavity is formed correspondingly thereto.

In addition, the second substrate 220 may have an end surface having a quadrangular shape, for example, a rectangle, so as to be coupled to the core member 100 to thereby form a chip shape. For example, a length of the second substrate 220 and a width of the second substrate 220 may be similar to the length and the width of the support part 110, respectively, and a height of the substrate 220 may be formed so that the two first protrusion portions 120a and 120b may be securely positioned in the cavity.

The coil portion 200b includes a coil connecting portion 210 that connects coil portions wound around the respective first protrusion portions 120a and 120b to one another. The coil connecting portion 210 is also formed in the cavity of the second substrate 220.

In a case in which the coil portions are wound around the two first protrusion portions 120a and 120b, respectively, and the coil connecting portion 210 is connected there between without including the second substrate 220, the coil connecting portion 210 may be broken or loosened.

On the other hand, by positioning the coil portion 200b including the coil connecting portion 210 in the cavity of the second substrate 220, the break or loosening of the connecting coil 210 is prevented.

Figure 8B:
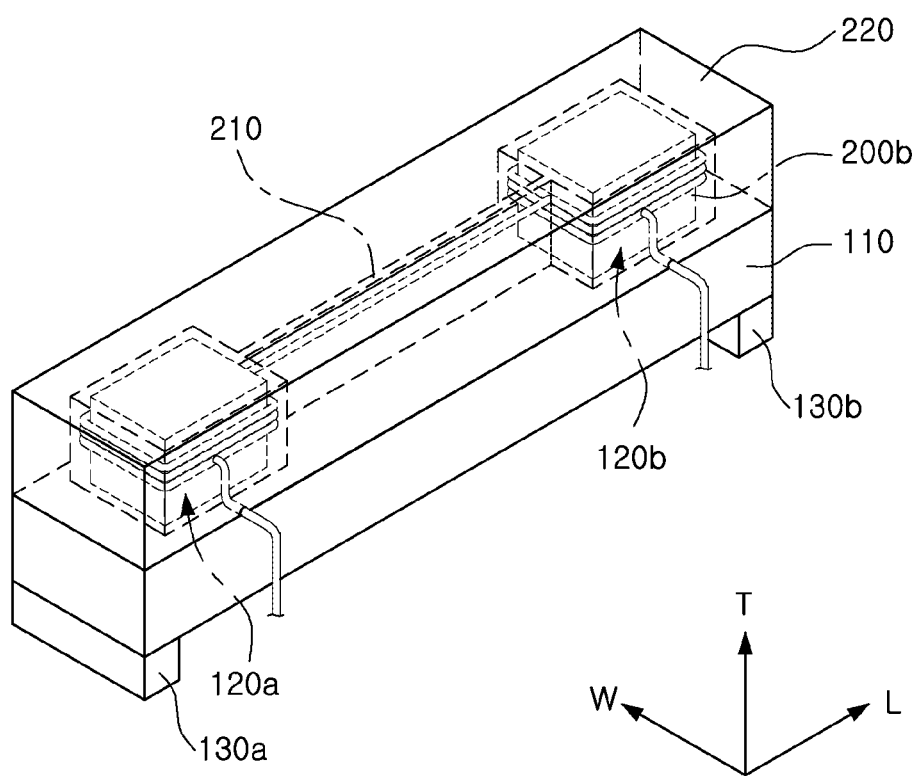
FIG. 8B is a view illustrating an example in which a coil portion is wound around a plurality of first protrusion portions in an antenna apparatus, according to another embodiment, different from that of FIG. 8A.

FIG. 8B is a view illustrating an example in which the coil portion is wound around the plurality of first protrusion portions in an antenna apparatus according to another embodiment, different from that of FIG. 8A.

Referring to FIG. 8B, unlike in FIG. 8A, the coil portion 200b itself, directly wound around the two first protrusion portions 120a and 120b, is positioned in the cavity of the second substrate 220.

That is, unlike in the case (FIG. 8A) in which the coil portion 200b is formed within the second substrate 220, the two first protrusion portions 120a and 120b themselves having the coil portion 200b wound there around are positioned in the cavity of the second substrate 220.

In this case, a size of the cavity of the second substrate 220 illustrated in FIG. 8B is greater than that of the cavity of the second substrate 220 illustrated in FIG. 8A so that the coil portion 200b is positioned in the cavity, unlike the description thereof provided in FIG. 8A.

Figure 9:
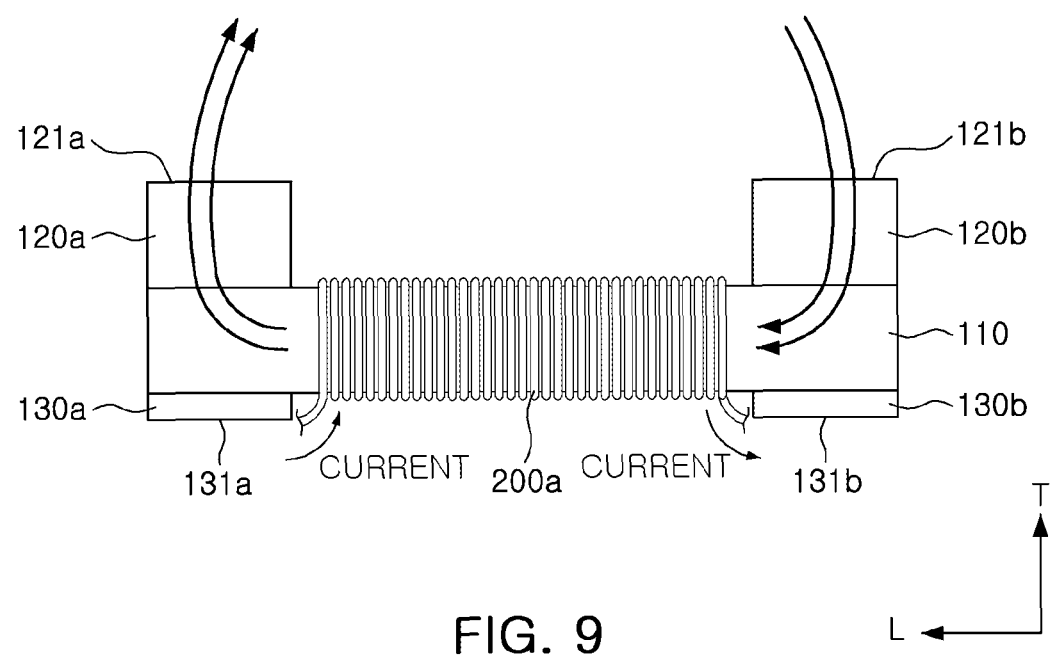
FIG. 9 is a view illustrating a direction of magnetic flux in an antenna apparatus, according to an embodiment in the present disclosure.

FIG. 9 is a view illustrating a direction of magnetic flux in an antenna apparatus according to an embodiment in the present disclosure.

Referring to FIG. 9, an antenna apparatus forms a magnetic path having an angle of 180° of a direction in which the magnetic flux enters with respect to a direction in which the magnetic flux exits.

More particularly, in a case in which the magnetic flux exits from the end surface 121a of the first protrusion portion 120a among the two first protrusion portions 120a and 120b, the magnetic flux enters the end surface 121b of the first protrusion portion 120b.

Conversely, in a case in which the magnetic flux exits from the end surface 121b of the first protrusion portion 120b, the magnetic flux enters the end surface 121a of the first protrusion portion 120a.

Therefore, a magnetic path is formed by disposing face to face an external electronic device using the NFC scheme and the antenna apparatus, and data is transmitted and received through two-way communications.

Figure 10A:
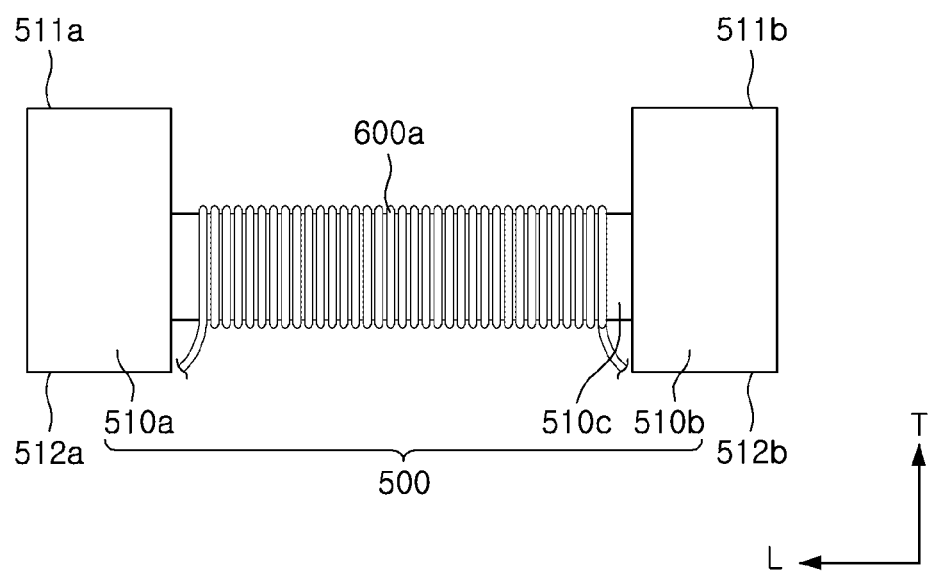
FIGS. 10A and 10B are perspective views illustrating an antenna apparatus, according to another embodiment in the present disclosure.
Figure 10B:
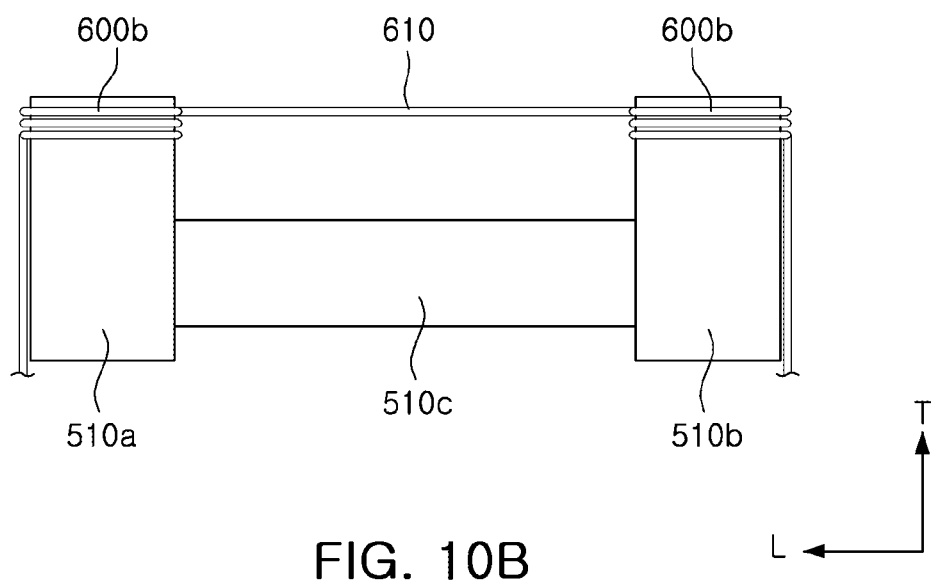

FIGS. 10A and 10B are perspective views of an antenna apparatus according to another embodiment in the present disclosure.

Referring to FIGS. 10A and 10B, an antenna apparatus according to another embodiment in the present disclosure includes a core member 500 and a coil portion 600a wound around the core member 500.

The core member 500 includes a first core portion 510a, a second core portion 510b, and a third core portion 510c.

The first core portion 510a includes a first end surface 511a through which magnetic flux enters and exits and a first mounting surface 512a, opposite to the first end surface 511a. The second core portion 510b includes a second end surface 511b through which the magnetic flux enters and exits and a second mounting surface 512b, opposite to the second end surface 511b.

The first and second end surfaces 511a and 511b of the first and second core portions 510a and 510b, respectively, have polygonal or circular shapes so that the antenna apparatus is mounted on the substrate to thereby allow for product miniaturization.

Further, the first and second core portions 510a and 510b have an overall pillar shape, but the shape of the first and second protrusion portions 510a and 510b is not limited thereto.

The third core portion 510c is disposed between the first and second core portions 510a and 510b. More particularly, the first and second core portions 510a and 510b is disposed so as to be perpendicular to the third core portion 510c at both ends of the third core portion 510c in a length direction of the third core portion 510c.

Accordingly, the first core portion 510a and the second core portion 510b are disposed on both end surfaces of the third core portion 510c in the length direction, respectively.

A coil portion is wound around the third core portion 510c (600a in FIG. 10A), or is wound around each of the first and second core portions 511a and 511b (600b in FIG. 10B).

Referring to FIG. 10A, the coil portion 600a is wound around the third core portion 510c and transmits and receives a signal in a frequency band of about 13.56 MHz to perform the NFC scheme. The coil portion 600a performs transmission and reception of data with an external electronic device through electromagnetic induction formed based on the entry and exit of the magnetic flux through the end surfaces 511a and 511b of the respective first and second core portions 510a and 510b.

In this case, the external electronic device includes an antenna capable of transmitting and receiving a signal in the same frequency band as that of the antenna apparatus according to the other embodiment.

In addition, the coil portion 600a is wound around the third core portion 510c in a circular manner as illustrated in FIG. 10A, but the winding of the coil portion 600a is not limited thereto.

Furthermore, the coil portion 600a is wound to have the same shape of the end surface of the third core portion 510c. For example, if the end surface of the third core portion 510c has a quadrangular shape, the coil portion 600a will be wound in a quadrangular shape. Additionally, the coil portion 600a may be wound around the third core portion 510c in an inclined manner (not illustrated).

Referring to FIG. 10B, the antenna apparatus according to the other embodiment in the present disclosure includes the coil portion 600b wound around each of the first and second core portions 510a and 510b. More particularly, the coil portion 600b is wound along the first and second end surfaces 511a and 511b.

Meanwhile, the number of turns of the coil portion 600b being wound around each of the first and second core portions 510a and 510b is determined based on a resonance frequency of the antenna apparatus according to the other embodiment so as to transmit and receive a signal in a frequency band of about 13.56 MHz.

Meanwhile, although not illustrated in FIG. 10B, the antenna apparatus according to the other embodiment in the present disclosure further includes the second substrate 220 (see FIG. 8A) having the cavity, and the coil portion 600b positioned in the cavity of the second substrate 220 (see FIG. 8A).

Accordingly, by positioning the coil portion 600b including a coil connecting portion 610 in the cavity of the second substrate 220 (see FIG. 8A), breaking or loosening of the coil connecting portion 610 is prevented.

In addition, the antenna apparatus according to the other embodiment has a chip structure formed by coupling the core member 500 and the second substrate 220 (see FIG. 8A) to one another, so as to allow for product miniaturization.

Since the material and shape of the coil portions 600a and 600b overlap those described above, a repeated description thereof will be omitted for conciseness.

Figure 11:
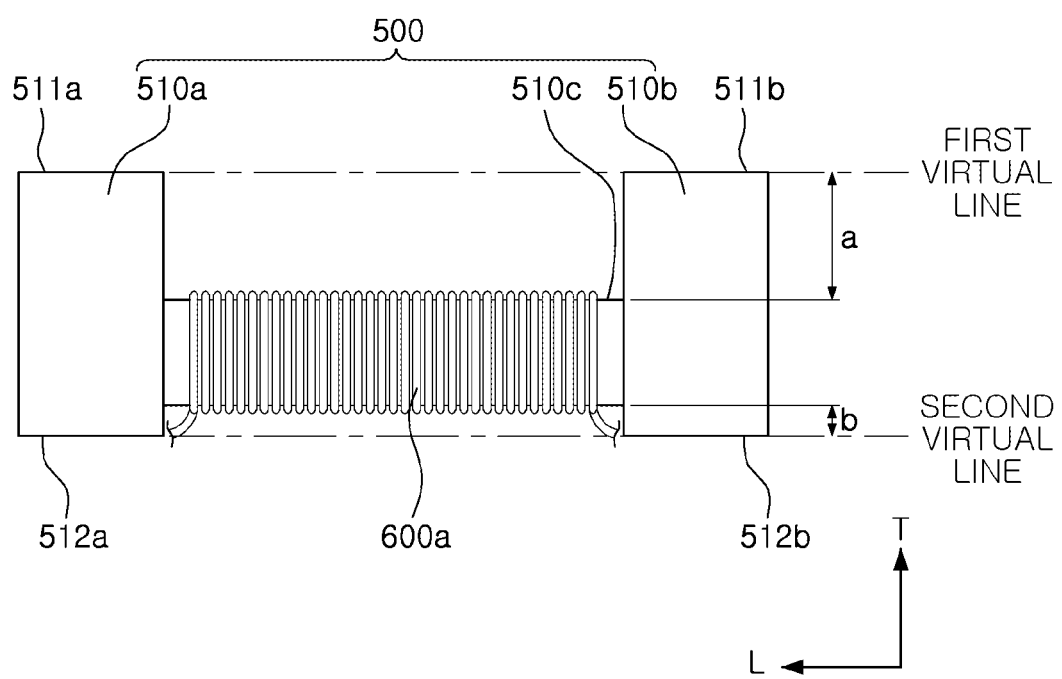
FIG. 11 is a view illustrating first and second virtual lines in an antenna apparatus, according to another embodiment in the present disclosure.

FIG. 11 is a view illustrating first and second virtual lines in an antenna apparatus according to another embodiment in the present disclosure.

Referring to FIG. 11, the first virtual line is a straight line connecting the first and second end surfaces 511a and 511b to one another. The second virtual line is a straight line connecting the first and second mounting surfaces 512a and 512b to one another.

In a case in which a distance from the first virtual line to the third core portion 510c is "a" and a distance from the second virtual line to the third core portion 510c is "b", "a" is greater than "b".

More particularly, the third core portion 510c is disposed between the first and second core portions 510a and 510b so that "a" has a greater value than "b," whereby the strength of magnetic flux that enters and exits through the first and second end surfaces 511a and 511b is increased.

FIGS. 12A through 12D are views illustrating an antenna apparatus according to another embodiment in the present disclosure and an electronic component including the same.

Referring to FIGS. 12A through 12D, the core member 500 further includes a first extension forming part 513a disposed on the first core portion 510a and a second extension forming part 513b disposed on the second core portion 510b.

More particularly, the first extension forming part 513a is disposed on the first core portion 510a in a direction from the third core portion 510c to the first core portion 510a. The second extension forming part 513b is disposed on the second core portion 510b in a direction from the third core portion 510c to the second core portion 510b.

That is, the first and second extension forming parts 513a and 513b are disposed in opposing directions based on the third core portion 510c. In addition, the core member 500 may have a 'Ⅱ' shape, that is, an inverted 'π' shape, by way of example.

The shape of the first and second extension forming parts 513a and 513b is not limited to the examples illustrated in FIGS. 12A through 12D. Therefore, the shape, end surface, and size of the parts may be provided in various manners.

In addition, the first and second extension forming parts 513a and 513b do not need to have the same shape as one another. Furthermore, the first and second extension forming parts 513a and 513b do not need to have same distances from the first and second mounting surfaces, respectively, thereto.

That is, the first and second extension forming parts 513a and 513b are disposed on the first and second core portions 510a and 510b so as to obtain a target direction of the magnetic flux.

Figure 12A:
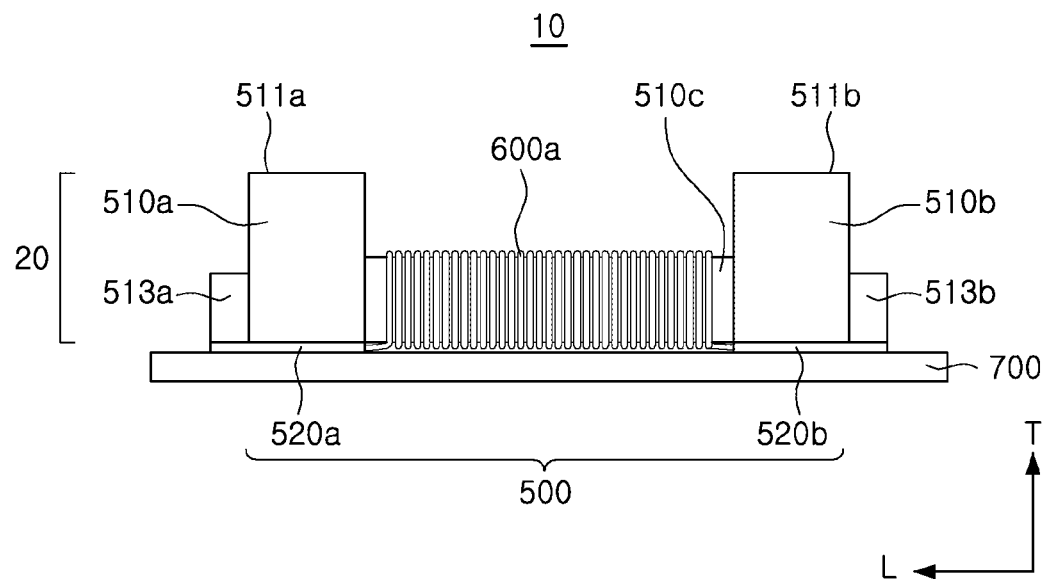
FIGS. 12A through 12D are views illustrating an antenna apparatus, according to another embodiment in the present disclosure, and an electronic component including the same.

Furthermore, although FIGS. 12A though 12D illustrate the first and second extension forming parts 513a and 513b to be separate structural elements from the third core portion 510c, in an alternative embodiment, the first and second extension forming parts 513a and 513b may be integral parts of the third core portion 510c.

Meanwhile, an antenna apparatus 20 according to another embodiment is mounted on a first substrate 700 through first and second pad parts 520a and 520b, so as to configure an electronic component 10.

The first substrate 700 is a substrate mounted in an interior of a portable terminal such as a smartphone. Additionally, the substrate includes a plurality of active elements, a plurality passive elements, and ICs which are mounted thereon. However, the types of elements included on the substrate is not limited thereto and thus the substrate may include more or less elements. Furthermore, a PCB is provided as the first substrate 700, but is not limited thereto and any other suitable surface may be provided as the first substrate 700.

The antenna apparatus 20 includes the core member 500 including the first core portion 510a having the first mounting surface on which the first pad part 520a is disposed, the second core portion 510b having the second mounting surface on which the second pad part 520b is disposed, and the third core portion 510c disposed between the first core portion 510a and the second core portion 510b, and the coil portion 600a wound around the core member 500.

The first core portion 510a further includes the first end surface 511a opposite to the first mounting surface, and the second core portion 510b includes the second end surface 511b opposite to the second mounting surface.

The core member 500 includes the first and second end surfaces 511a and 511b through which the magnetic flux enters and exits.

The first and second pad parts 520a and 520b are formed to extend from one of the surfaces of the first and second extension forming parts 513a and 513b in a direction of the first substrate 700, respectively.

Thereby, a fixing strength of the antenna apparatus 20 with the first substrate 700 is improved, preventing the antenna apparatus 20 from becoming loose when the antenna apparatus 20 is mounted on the first substrate 700. It is noted that although FIGS. 12A and 12B illustrate the first and second extension forming parts 513a and 513b being disposed over a portion of the first and second pad parts 520a and 520b, this is merely an example and the first and second extension forming parts 513a and 513b can differ in dimension from that of the first and second pad parts 520a and 520b.

The first and second pad parts 520a and 520b are positioned to be spaced apart from one another so as to perform an SMT on the first substrate 700. In this case, the antenna apparatus 20 is electrically connected to the first substrate 700 by a soldering scheme in which the first and second pad parts 520a and 520b are disposed on the first substrate 700.

Figure 12B:
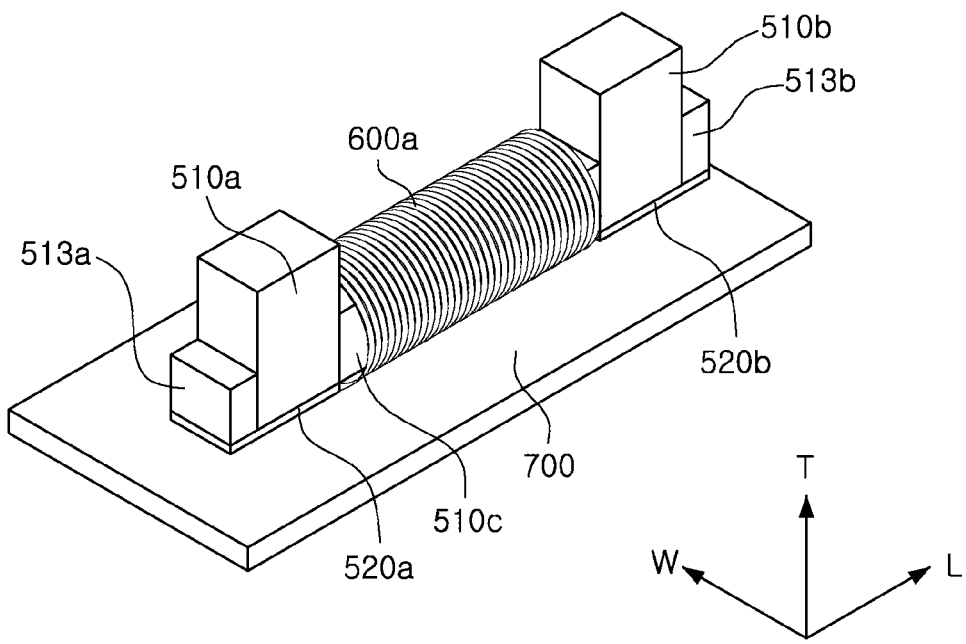

Referring to FIGS. 12A and 12B, a coil portion 600a is wound around the third core portion 510c.

Figure 12C:
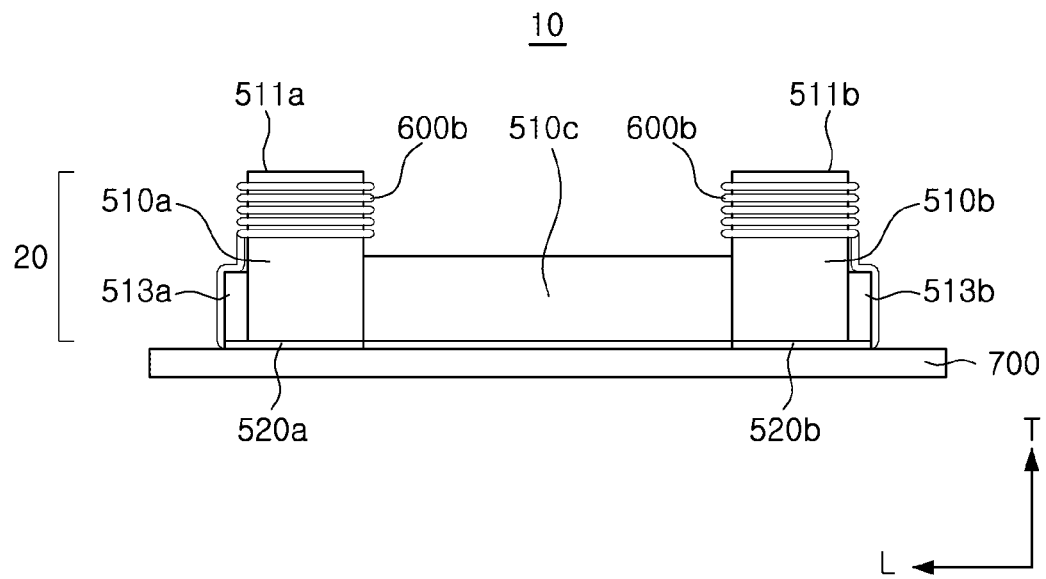
Figure 12D:
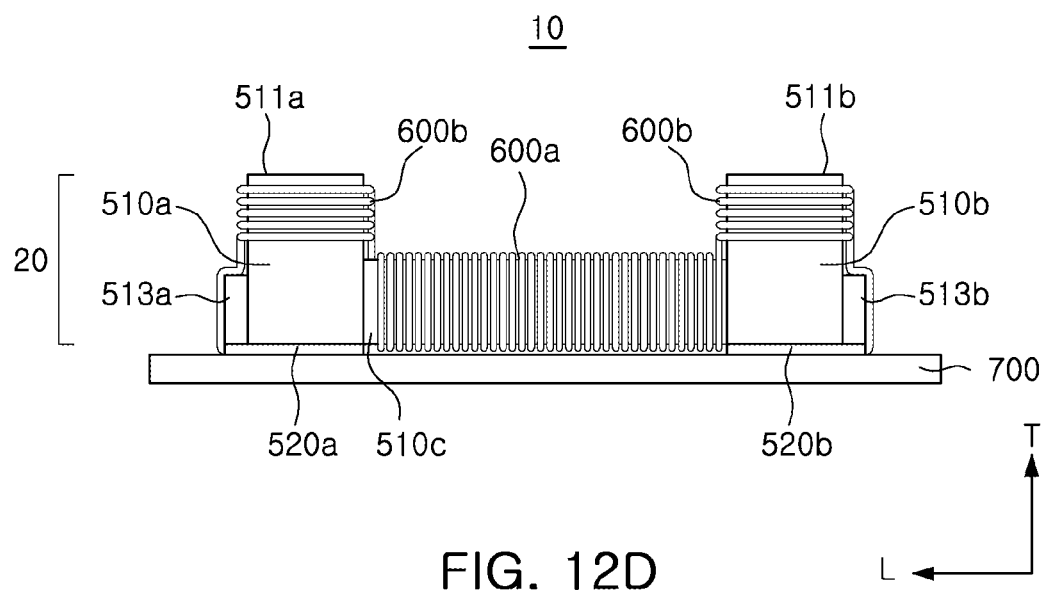

Alternatively, referring to FIG. 12C, the coil portion 600b is wound around the first and second core portions 510a and 510b. Further, referring to FIG. 12D, the coil portion 600a is wound around the third core portion 510c, and the coil portion 600b is wound around the first and second core portions 510a and 510b. It is noted that although FIGS. 12C and 12D illustrate the coil portion 600b being wound and extending from an upper end surface 511a to the third core portion 510c this is merely an example and thus the coil portion 600b may be wound differently. Similarly, although FIGS. 12A, 12B and 12D illustrate the coil portion 600a being mostly would around an entire surface of the third core portion 510c, this is merely an example and thus the coil portion 600a may be wound differently around the third core portion 510c.

The coil portions 600a and 600b transmit and receive data through electromagnetic induction formed based on entry and exit of the magnetic flux. More particularly, the coil portions 600a and 600b are electrically connected to a circuit part mounted on the first substrate 700 through the first and second pad parts 520a and 520b.

More particularly, the first substrate 700 includes the circuit part including the NFC chip (not illustrated) disposed thereon. In this case, the coil portions 600 are electrically connected to the circuit part through the first and second pad parts 520a and 520b.

The coil portion 600a and 600b perform transmission and reception of data with an external electronic device through electromagnetic induction formed based on the entry and exit of the magnetic flux through the end surfaces 511a and 511b of the respective first and second core portions 510a and 510b. In this case, the external electronic device includes an antenna capable of transmitting and receiving a signal in the same frequency band as that of the antenna apparatus 20 according to an embodiment.

Since the manner in which the coil portions 600a and 600b are wound around, the number of turns in which the coil portions 600a and 600b are wound around, the material of the coil portions 600a and 600b, and the shape of end surfaces of the coil portions 600a and 600b are the same as those described above, a repeated description thereof will be omitted for conciseness.

Meanwhile, although not illustrated in FIGS. 12C and 12D, the antenna apparatus according to another embodiment in the present disclosure further includes the second substrate 220 (see FIGS. 8A and 8B) having the cavity, and the coil portion 600b positioned in the cavity of the second substrate 220 (see FIGS. 8A and 8B).

The antenna apparatus 20 according to the other embodiment includes a chip structure formed by coupling the core member 500 and the second substrate 220 (see FIG. 8A) to one another, so as to allow for product miniaturization.

Figure 13A:
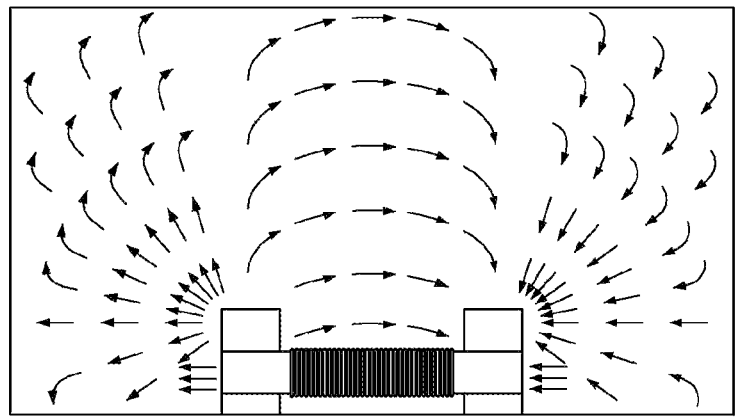
FIGS. 13A and 13B are views illustrating a direction of magnetic flux based on a position in an antenna apparatus, according to an embodiment in the present disclosure, around which a coil portion is wound.
Figure 13B:
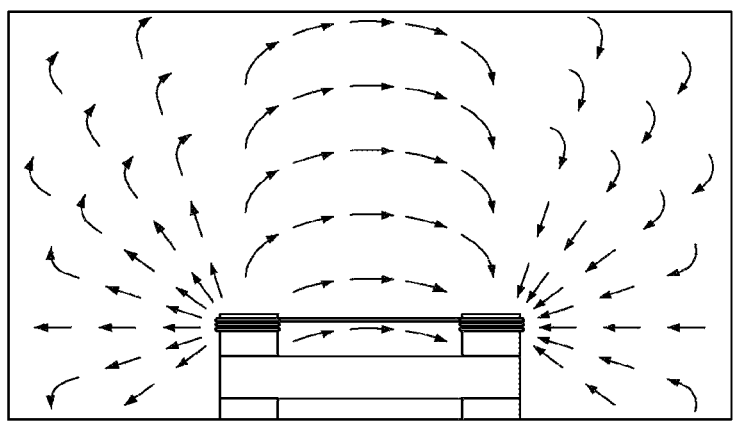

FIGS. 13A and 13B are views illustrating a direction of magnetic flux based on a position in an antenna apparatus according to an embodiment in the present disclosure around which the coil portions 200a and 200b (see FIGS. 1 and 6A) are wound.

Referring to FIGS. 13A and 13B, it is seen that strength of the magnetic flux formed around the two first protrusion portions 120a and 120b (see FIG. 1) is stronger in the case in which the coil portion 200a (see FIG. 1) is wound around the support part 110 (see FIG. 1), as compared to the case in which the coil portion 200b (see FIG. 6A) is wound around the plurality of first protrusion portions 120.

Figure 14:
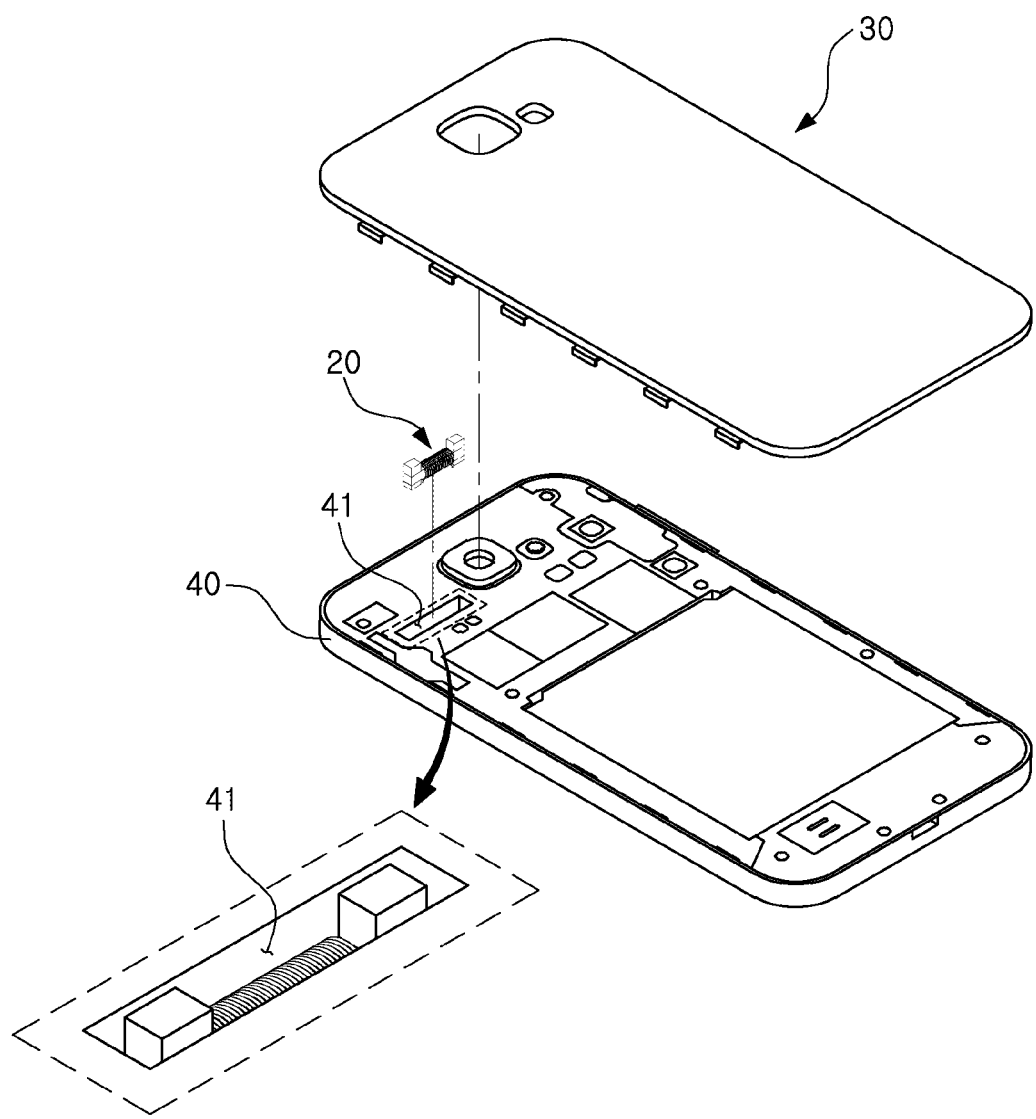
FIG. 14 is an exploded perspective view illustrating an electronic device, according to another embodiment in the present disclosure.

FIG. 14 is an exploded perspective view illustrating an electronic device according to another embodiment in the present disclosure.

Referring to FIGS. 1, 3A, and 14, an electronic device according to another embodiment in the present disclosure includes a cover 30 for an electronic device, the antenna apparatus 20 disposed inwardly of the cover 30 for the electronic device, and the first substrate 400 (see FIG. 3A).

The cover 30 for the electronic device is disposed over the electronic device. For example, the cover 30 for the electronic device is an external cover. Although the cover 30 for the electronic device is described as the external cover by way of example in the present embodiment, the cover 30 for the electronic device is not limited thereto.

Meanwhile, a material of the cover 30 for the electronic device may be plastic by way of example but is not limited thereto.

The antenna apparatus 20 includes the core member 100 having the support part 110, the plurality of first protrusion portions 120 disposed on one surface of the support part 110, and the plurality of second protrusion portions 130 disposed on the other surface of the support part 110, opposite to one surface of the support part 110, and the coil portion 200a wound around the core member 100.

The plurality of first protrusion portions 120 include the plurality of end surfaces 121a and 121b through which the magnetic flux enters and exits, and the shape and position of the plurality of end surfaces 121a and 121b are not limited as long as the magnetic flux enters and exits there through.

The plurality of second protrusion portions 130 include the plurality of end surfaces 131a and 131b provided as the mounting surfaces, respectively, and the antenna apparatus 20 is mounted on the first substrate 400 through the first and second pad parts 310 and 320 disposed on the end surfaces 131a and 131b which are provided as the mounting surfaces, respectively.

In this case, although not illustrated in FIG. 14, the antenna apparatus 20 mounted on the first substrate 400 further includes the first molding part 410 (FIG. 4A) disposed between the two first protrusion portions 120a and 120b.

Alternatively, the antenna apparatus 20 mounted on the first substrate 400 further includes the second molding part 420 (FIG. 4B) formed so as to encapsulate the support part 110, the two first protrusion portions 120a and 120b, and the two second protrusion portions 130a and 130b.

Since descriptions of the first molding part 410 and the second molding part 420 are the same as those described with reference to FIGS. 4A and 4B, a repeated description thereof will be omitted for conciseness.

Meanwhile, the first substrate 400 includes a circuit part to which the antenna apparatus 20 is connected, and more particularly, includes an NFC chip (not illustrated) electrically connected to the antenna apparatus 20.

Therefore, the antenna apparatus 20 is mounted on the first substrate 400 and is disposed inwardly of the cover 30 for the electronic device. Additionally, the antenna apparatus 20 is disposed in a groove 41 formed in an internal cover of the portable terminal, for example, the electronic device. Alternatively, the antenna apparatus 20 is disposed in a battery (not illustrated).

The coil portion 200a among the components of the antenna apparatus 20 as described above is electrically connected to a circuit part of a body of the portable terminal through the first and second pad parts 310 and 320, and the coil portion 200a is not limited to a particular position as long as the antenna apparatus 20 forms an electromagnetic coupling with the cover 30 for the electronic device.

However, for example, in the case in which the antenna apparatus 20 is used as an antenna performing the NFC scheme, the antenna apparatus 20 is disposed in a position of the electronic device at which an electromagnetic wave enters and exits through a portion of the cover 30 for the electronic device.

As set forth above, according to embodiments in the present disclosure, the antenna apparatus, and the electronic component and the electronic device including the same are provided by forming the antenna apparatus in the chip shape, whereby an area of the substrate occupied by the antenna apparatus in the case in which the antenna apparatus is mounted thereon is reduced.

In addition, a ferrite sheet formed below the core member to remove the eddy current may not be needed.

Furthermore, since the antenna apparatus is directly mounted on the substrate through the pad parts without an additional substrate mounting structure, miniaturization of the antenna apparatus is achieved. Additionally, a relatively simplified mounting of the antenna apparatus on the substrate is provided.

While various embodiments have been shown and described above, it will be apparent to those skilled in the art that modifications and variations could be made without departing from the scope of the present disclosure as defined by the appended claims.

What is claimed is:

1. An antenna apparatus, comprising:
a core member comprising a support part, first protrusion portions disposed on one surface of the support part, second protrusion portions disposed on the other surface of the support part, opposite to the one surface of the support part; and
a coil portion wound around the core member,
wherein the second protrusion portions have end surfaces provided as mounting surfaces, respectively, and
wherein one of the first protrusion portions has an inclined nonparallel surface relative to a longitudinal direction of the support part.

2. The antenna apparatus of claim 1, wherein the core member is mounted on a first substrate through pad parts disposed on the mounting surfaces of the second protrusion portions, respectively.

3. The antenna apparatus of claim 1, wherein the first and second protrusion portions are disposed on the support part so that the core member has an 'H' shape.

4. The antenna apparatus of claim 1, wherein the first protrusion portions have end surfaces through which magnetic flux enters and exits.

5. The antenna apparatus of claim 1, wherein a length of one of the first protrusion portions protruding from the support part is different from a length of one of the second protrusion portions protruding from the support part.

6. The antenna apparatus of claim 1, wherein the coil portion is wound around the support part.

7. The antenna apparatus of claim 1, wherein the coil portion is wound around each of the first protrusion portions.

8. The antenna apparatus of claim 7, further comprising a second substrate coupled to the core member,
wherein the coil portion is positioned in a cavity of the second substrate.

9. An apparatus comprising:
a core member comprising a first protrusion portion with end surfaces through which magnetic flux enters and exits and a mounting surface mounted on a first substrate; and
a coil portion wound around the core member and the first protrusion portion.

10. The apparatus of claim 9, wherein the core member is mounted on the first substrate through a pad part disposed on the mounting surface of the core member.

11. The apparatus of claim 9, wherein the core member has an angle of 180° of a direction in which the magnetic flux enters one of the end surfaces of the core member with respect to a direction in which the magnetic flux exits from one of the end surfaces of the core member.

12. The apparatus of claim 9, wherein the core member further comprises:
a second protrusion portion having the mounting surface; and
a support part having the first protrusion portion disposed on a first surface of the support part and the second protrusion portion disposed on a second surface of the support part, opposite to the first surface of the support part.

13. The apparatus of claim 12, wherein the coil portion is wound around one of the support part and the first protrusion portion.

14. An apparatus comprising:
a core member comprising a first core portion having a first end surface through which magnetic flux enters and exits and a first mounting surface opposite to the first end surface, a second core portion having a second end surface through which the magnetic flux enters and exits and a second mounting surface opposite to the second end surface, and a third core portion disposed between the first and second core portions;

a coil portion wound around the core member; and first and second pad parts disposed on the first mounting surface of the first core portion and the second mounting surface of the second core portion, respectively, wherein the first and second core portions each have a greater height than each of the first and second mounting surfaces.

15. The apparatus of claim 14, wherein the core member is mounted on a first substrate through the first and second pad parts.

16. The apparatus of claim 14, wherein one of the first and second end surfaces is inclined.

17. The apparatus of claim 14, wherein areas of the first and second end surfaces are greater than areas of the first and second mounting surfaces, respectively.

18. The apparatus of claim 14, wherein upon a distance from a first virtual line connecting the first and second end surfaces to one another to the third core portion is "a" and a distance from a second virtual line connecting the first and second mounting surfaces to one another to the third core portion is "b", "a" is greater than "b".

19. The apparatus of claim 14, wherein the core member further comprises:

a first extension forming part disposed on the first core portion; and a second extension forming part disposed on the second core portion, wherein the first and second extension forming parts are disposed in opposing directions relative to the third core portion.

20. The apparatus of claim 14, wherein the core member has a "H" shape.

21. The apparatus of claim 14, wherein the coil portion is wound around the first and second core portions.

22. The apparatus of claim 21, further comprising a second substrate having a cavity and coupled to the core member, wherein the coil portion is positioned in the cavity of the second substrate.

23. The apparatus of claim 14, wherein the coil portion is wound around the third core portion.

24. The apparatus of claim 14, wherein the coil portion is wound around each of the first, second, and third core portions.

25. An electronic component comprising:

a first substrate; and an antenna apparatus disposed on the first substrate through first and second pad parts to be connected to a circuit part, wherein the antenna apparatus comprises a core member comprising a first core portion having a first mounting surface having the first pad part disposed thereon, a second core portion having a second mounting surface having the second pad part disposed thereon, and a third core portion disposed between the first and second core portions, and a coil portion wound around the core member, and wherein a complete loop of the coil portion is wound around each of the first and second core portions.

26. The electronic component of claim 25, wherein the first core portion further comprises a first end surface opposite to the first mounting surface and the second core portion further comprises a second end surface opposite to the second mounting surface, and magnetic flux enters and exits the first and second end surfaces, and the coil portion transmits and receives data through electromagnetic induction based on the entry and exit of the magnetic flux.

27. The electronic component of claim 26, wherein upon a distance from a first virtual line connecting the first and second end surfaces to one another to the third core portion is "a" and a distance from a second virtual line connecting the first and second mounting surfaces to one another to the third core portion is "b", "a" is greater than "b".

28. The electronic component of claim 26, wherein one of the first and second end surfaces is inclined.

29. The electronic component of claim 26, wherein areas of the first and second end surfaces are greater than areas of the first and second mounting surfaces, respectively.

30. The electronic component of claim 25, further comprising a second substrate having a cavity and coupled to the core member, wherein the coil portion is positioned in the cavity of the second substrate.

31. The electronic component of claim 25, wherein the coil portion is wound around the third core portion.

32. The electronic component of claim 25, wherein the core member further comprises:

a first extension forming part disposed on the first core portion; and a second extension forming part disposed on the second core portion, wherein the first and second extension forming parts are disposed in opposing directions relative to the third core portion.

33. An electronic device, comprising:

a cover for an electronic device;

an antenna apparatus disposed between the cover and the electronic device; and a first substrate having a circuit part to which the antenna apparatus is connected, wherein the antenna apparatus comprises a core member having a support part, first protrusion portions disposed on one surface of the support part, and second protrusion portions disposed on the other surface of the support part, opposite to one surface of the support part, and a coil portion wound around the core member, the second protrusion portions have end surfaces provided as mounting surfaces, respectively, and the antenna apparatus is mounted on the first substrate through pad parts disposed on the end surfaces of the second protrusion portions provided as the mounting surfaces, respectively, and wherein a complete loop of the coil portion is wound around the first protrusion portions.

34. The electronic device of claim 33, wherein the circuit part comprises a near field communication (NFC) chip electrically connected to the antenna apparatus.

35. The electronic device of claim 33, wherein the antenna apparatus further comprises a second substrate coupled to the core member, and the coil portion is positioned in a cavity of the second substrate.

36. The electronic device of claim 33, wherein the antenna apparatus further comprises a coil portion wound around the support part.

37. The electronic device of claim 33, wherein the first protrusion portions have end surfaces through which magnetic flux enters and exits.

38. An antenna apparatus, comprising:
a core member including a support part, first protrusion portions disposed on upper end surfaces of the support part and second protrusion portions disposed on lower end surfaces of the support part; and
a coil portion wound around a portion of the support part,
wherein one of the first protrusion portions has an inclined nonparallel surface relative to a longitudinal direction of the support part.

39. The antenna apparatus of claim 38, wherein the coil portion would around the support part extends between the first protrusion portions and the second protrusion portions.

40. The antenna apparatus of claim 38, wherein a thickness of the first protrusion portions is greater than a thickness of the second protrusion portions.

* * * * *